United States Patent
Semer

(10) Patent No.: US 11,855,306 B1
(45) Date of Patent: Dec. 26, 2023

(54) METHODS OF PRODUCTION AND STORAGE OF ELECTRIC POWER

(71) Applicant: Jerry Semer, Fremont, OH (US)

(72) Inventor: Jerry Semer, Fremont, OH (US)

( * ) Notice: Subject to any disclaimer, the term of this patent is extended or adjusted under 35 U.S.C. 154(b) by 681 days.

(21) Appl. No.: 16/735,829

(22) Filed: Jan. 7, 2020

Related U.S. Application Data

(62) Division of application No. 15/415,340, filed on Jan. 25, 2017, now Pat. No. 10,566,633.

(51) Int. Cl.
| | | |
|---|---|---|
| *H01M 6/34* | (2006.01) | |
| *B01D 61/42* | (2006.01) | |
| *C25B 1/04* | (2021.01) | |

(52) U.S. Cl.
CPC ............ *H01M 6/34* (2013.01); *B01D 61/422* (2013.01); *C25B 1/04* (2013.01); *B01D 2325/42* (2013.01)

(58) Field of Classification Search
CPC .......... H01M 8/16; H01M 8/18; H01M 8/004; H01M 8/0252; H01M 6/34; H01M 6/144; B01D 61/422; B01D 2325/42; C25B 1/04; C02F 1/4604–46109
See application file for complete search history.

(56) References Cited

U.S. PATENT DOCUMENTS

| | | | |
|---|---|---|---|
| 2003/0164613 A1* | 9/2003 | Finley | F03G 7/04 290/54 |
| 2013/0017414 A1* | 1/2013 | He | C02F 1/445 204/252 |
| 2015/0249255 A1* | 9/2015 | Bocquet | F03G 7/005 429/479 |
| 2019/0226463 A1* | 7/2019 | Feng | B01D 71/02 |

OTHER PUBLICATIONS

Vermaas et al. ("Doubled Power Density from Salinity Gradients at Reduced Intermembrane Distance," Environmental Science & Technology, 2011, 45, 7089-7095.) (Year: 2011).*
Jones et al. "Recent Developments in Salinity Gradient Power," Common Heritage Corporation, Doherty Lecture, 2001, pp. 2284-2287). (Year: 2001).*

* cited by examiner

*Primary Examiner* — Brian R Ohara
*Assistant Examiner* — Claire L Roe
(74) *Attorney, Agent, or Firm* — Jerry Semer

(57) ABSTRACT

This invention uses the process of osmosis and diffusion of a liquid of low concentration into a liquid of high concentration. The device taps the energy created by a liquid of low concentration flowing into a liquid of high concentration. The inventor has created several embodiments that can be heat engines, heat pumps, energy storage devices, and batteries. The invention changes solar ponds and concentration cells into heat storage devices and rechargeable batteries. Osmosis at two semipervious membranes, one heated and one cooled, in a loop of tubing produces a heat engine. A heat pipe is changed into a heat engine by using different concentrations at each end. Two vessels, one containing a high concentration of a liquid and the other containing a low concentration of a liquid, can be configured with the used of electrodes, turbines, semipervious membranes into heat engines, heat pumps, energy storage devices, and batteries.

9 Claims, 37 Drawing Sheets

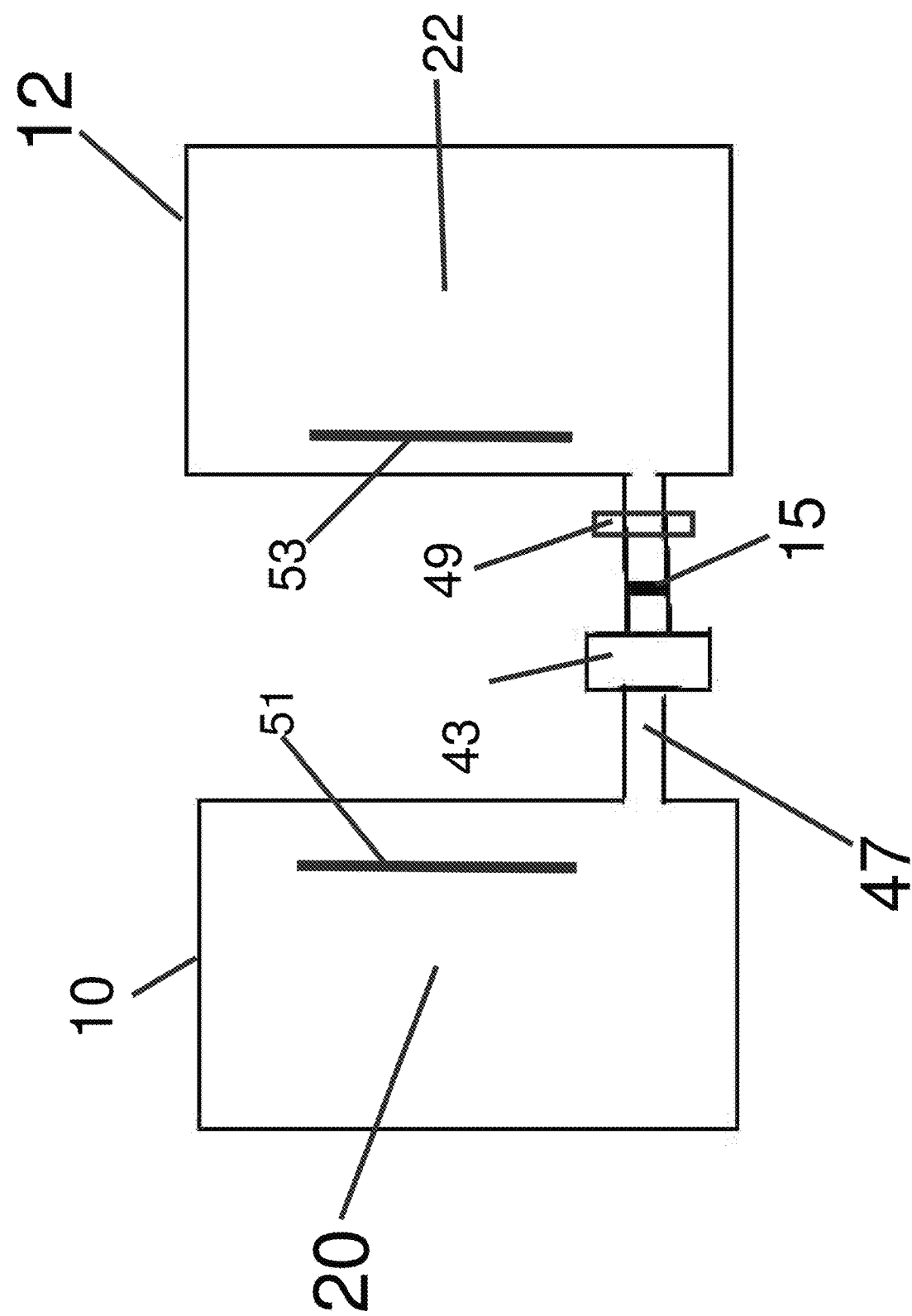

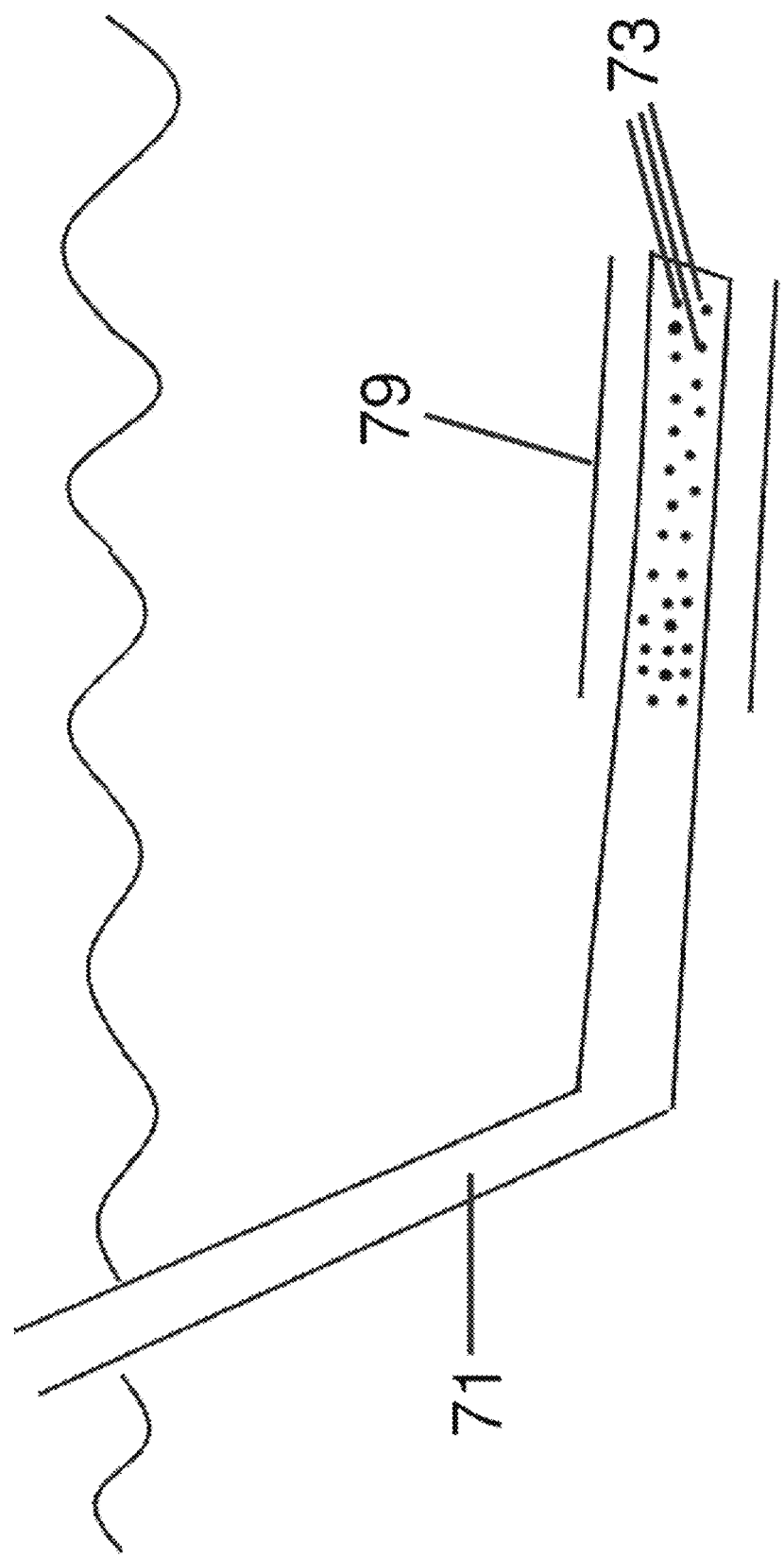

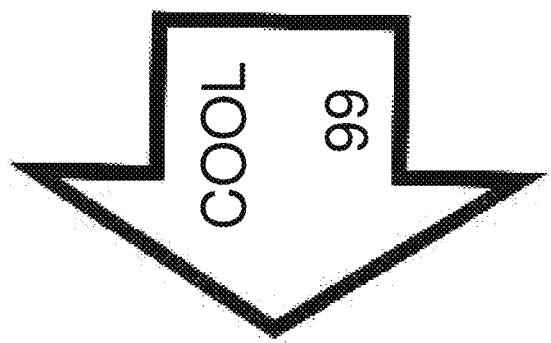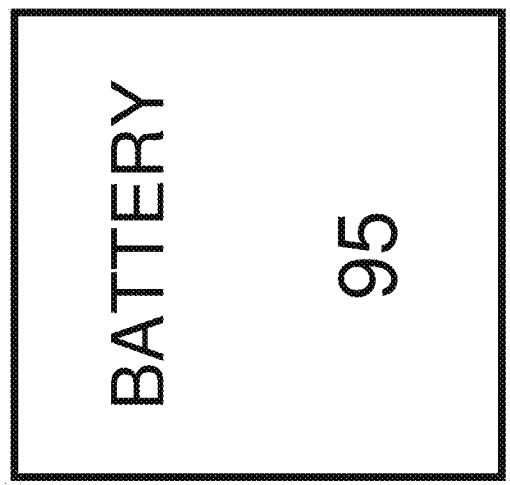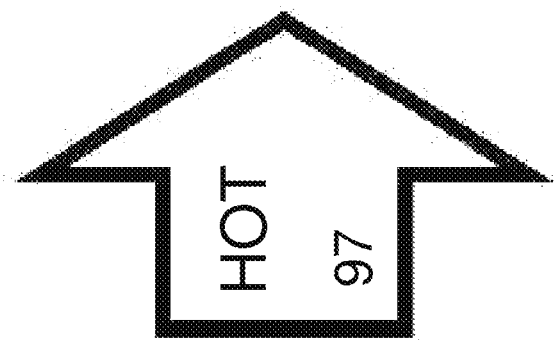
Fig 16B

METHODS OF PRODUCTION AND STORAGE OF ELECTRIC POWER

FIELD OF THE INVENTION

This invention relates to the field of electric power production and storage, more particularly to the field of electric power production and storage by low cost systems involving solutions and solute.

BACKGROUND OF THE INVENTION

We live in a world that needs more and more electric power. It also needs this increasing power to be produced by a source that does not give off carbon dioxide. Carbon dioxide is a greenhouse gas that is causing global warming. What is necessary is a new energy source that does not create carbon dioxide. This new energy must also be present in large quantities in the world and must be able to extract cheaply.

Power from osmosis has been known for years. There is also plenty of fresh water from rivers flowing into the ocean with salt water. These areas at the mouths of rivers that flow into the ocean could be used as a source of power.

Concentration cells have been known for years. These cells comprise two tanks of liquid that are attached, usually by a membrane or a salt bridge. If the cells contain solutions in which one solution is of a higher concentration than the other, the lower concentration solution will flow into the higher concentration solution. If electrodes are placed in each and are attached, electric will flow through the wire attaching the electrodes. The tanks will produce electricity until the two solutions are of equal concentration.

In nature, salt water in the ocean has a higher concentration of salt than fresh water in rivers. At the mouth of the river, the fresh water flows faster into the ocean water due to osmotic pressure. Electrodes or turbines could also tap this energy. Electrodes could be placed in the fresh water and in the ocean water.

Fresh water begins as water vapor that is evaporated from the oceans by solar energy. This water vapor rises in the atmosphere forms clouds, ultimately resulting in precipitation. Some of this precipitation occurs over land forming fresh water lakes and rivers. Eventually, all of this fresh water makes its way back to the oceans, thus completing the cycle. In fact, throughout the world, enormous quantities of fresh water are freely washed into the ocean each year as part of the naturally occurring water cycle.

Energy called the "free energy of mixing" (or "heat of mixing") occurs when fresh water flows into salt water. The free energy of mixing reflects an increase in entropy of water (or other solvents) when it is transformed from its pure (fresh-water) state to its diluted (salt-water) state. It is a physical property of solvents, such as water, that they have a natural tendency to migrate from an area of relatively low solute concentration (lower entropy) to an area of relatively high solute concentration (higher entropy). Thus, an entropy gradient is created whenever two bodies of water or other solvent having differing solute concentrations are brought into contact with one another and begin to mix. This entropy gradient can be physically observed and measured in the well-known phenomena known as osmosis. It can also be physically observed and measured by a concentration cell.

Thus, a substantial amount of electric power can be generated by placing electrodes within a river and placing electrodes in the ocean and attaching those electrodes through a load. This electric power will be produced with no generation of carbon dioxide. It will have a low environmental impact.

The other natural source of electric power from a concentration or entropy gradient occurs in salt water lakes and the ocean. Salt water is denser than freshwater. Thus, the water in a salt water lake or the ocean has different concentrations of salt at different depth. By placing electrodes at different depth and attaching them to a load, electricity will flow.

A battery can also be formed by salt water and fresh water. This battery can be formed by taking a container and placing heavily concentrated salt water in the bottom and placing fresh water on the top. By placing electrodes in the bottom in the heavily concentrated salt water and placing electrodes in the top in the fresh water and hooking these electrodes to a load, electricity will flow. Over time the salt water will diffuse into the fresh water, and ultimately electric will cease to flow. It is not necessary to use salt water and fresh water. Any solute and solvent can be used. The only necessity is the difference in the concentrations.

A solar pond could also be used for a type of battery. In a solar pond, the bottom layer of water has a high salt concentration. The top layer of water has a low salt concentration. Thus, by placing an electrode in the lower layer of heavily concentrated salt in the solar pond and placing an electrode in the upper layer of the much lower concentration of salt, a battery can be formed. By attaching the two electrodes to a load, electric will flow.

A concentration cell can easily be changed into a rechargeable battery.

There are many sources of thermal energy in which there is only a small temperature difference between the source of the thermal energy and the sink. These sources include geothermal energy, ocean thermal energy, many solar sources, waste heat from engines, and differential between atmospheric temperature and ground temperature. These sources have large amounts of thermal energy. However, since the efficiency of tuning thermal energy into mechanical energy is based on the temperature difference, these sources can only change a small percentage of the thermal energy to mechanical or electrical energy. Due to this fact, even though there are many small temperature different thermal energy sources, very little of this energy is used to produce power. The big reason for this is that the cost of engines that turn thermal energy into mechanical energy. Both Rankin engines and Sterling engines can turn low temperature difference thermal energy into mechanical energy. However, both these types of engines are expensive. The object of this invention is to produce an engine that will change small temperature different thermal energy into mechanical energy efficiently that is very inexpensive to manufacture and run.

BRIEF DESCRIPTION OF THE DRAWINGS

FIG. 5A is a view of another embodiment of a concentration cell that is a rechargeable battery.

FIG. 16B is a view of a battery system attached to a heat source and a cool source.

DETAILED DESCRIPTION OF THE PREFERRED EMBODIMENT

Figure 1:
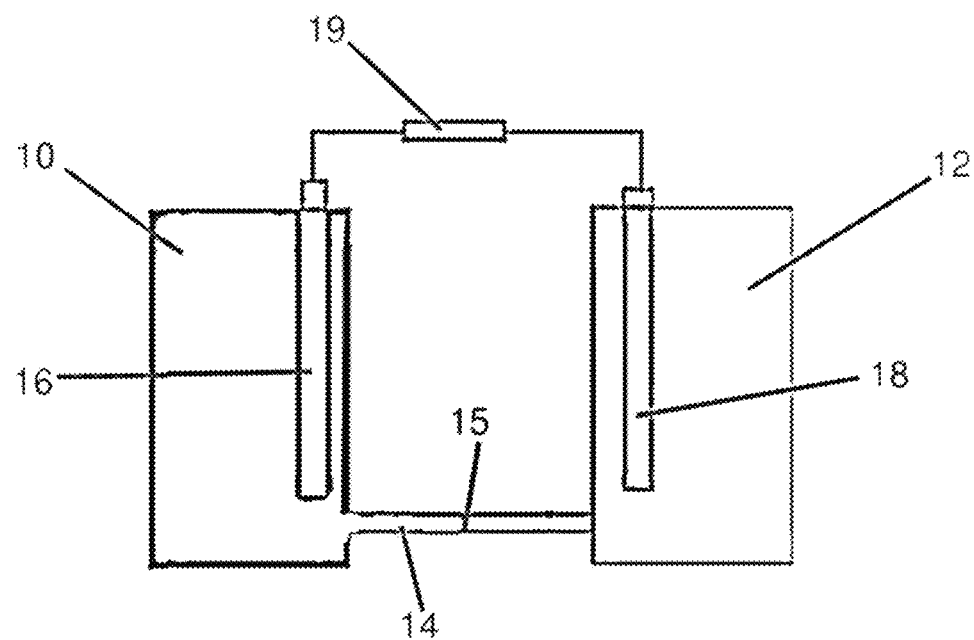
FIG. 1 is a view of a concentration cell from prior art.
Figure 1A:
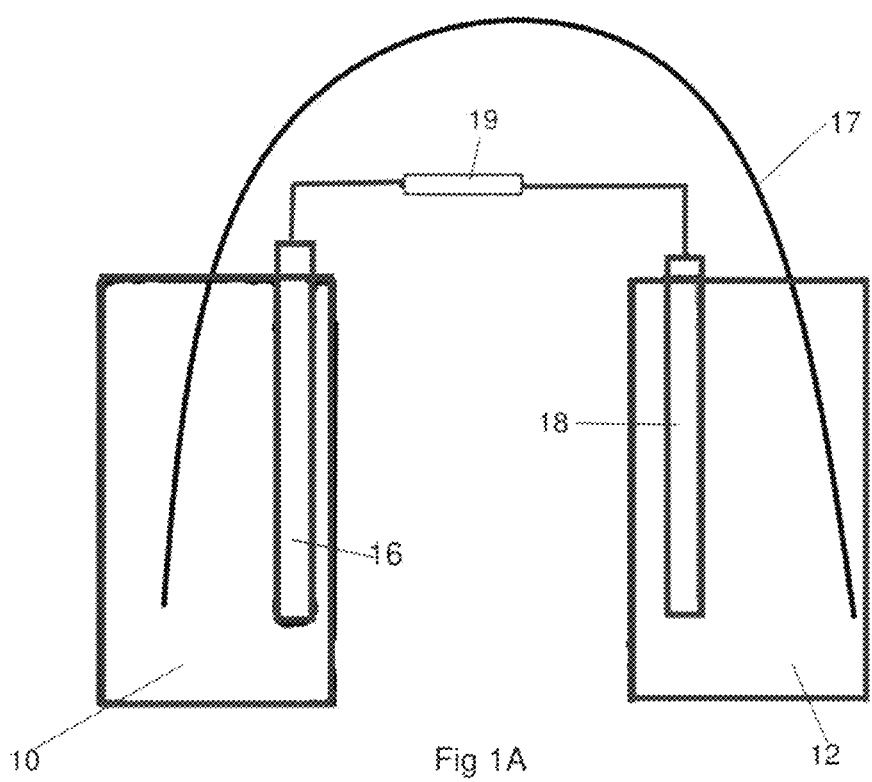
FIG. 1A is a view of another embodiment of a concentration cell from prior art.

FIGS. 1 and 1A shows a prior art concentration cell. The cell in FIG. 1 has two tanks 10 and 12. The two tanks 10 and 12 are attached together by a channel 14. Within a channel 14 is a membrane 15. In tank 10 an electrode 16 is placed. In tank 12, an electrode 18 is placed. Tank 10 is filled with a liquid of high concentration. Tank 12 is filled with a liquid of low concentration. When the electrodes 16 and 18 are attached to a load 19, electricity will flow between the two electrodes 16 and 18.

FIG. 1A shows another embodiment of a concentration cell. FIG. 1A is comprised of two tanks 10 and 12. Tank 10 contains a solution with a high concentration. Tank 12 contains a solution of a low concentration. Between the two tanks is a bridge 17 that allows ions solution to pass from one tank to the other. Electrode 16 is placed in a tank 10, and an electrode 18 is placed in tank 12. When electrodes are attached, electric will flow through a load 19. The electric will continue to flow until the concentrations of the solutions in tanks 10 and 12 are equal.

Figure 2:
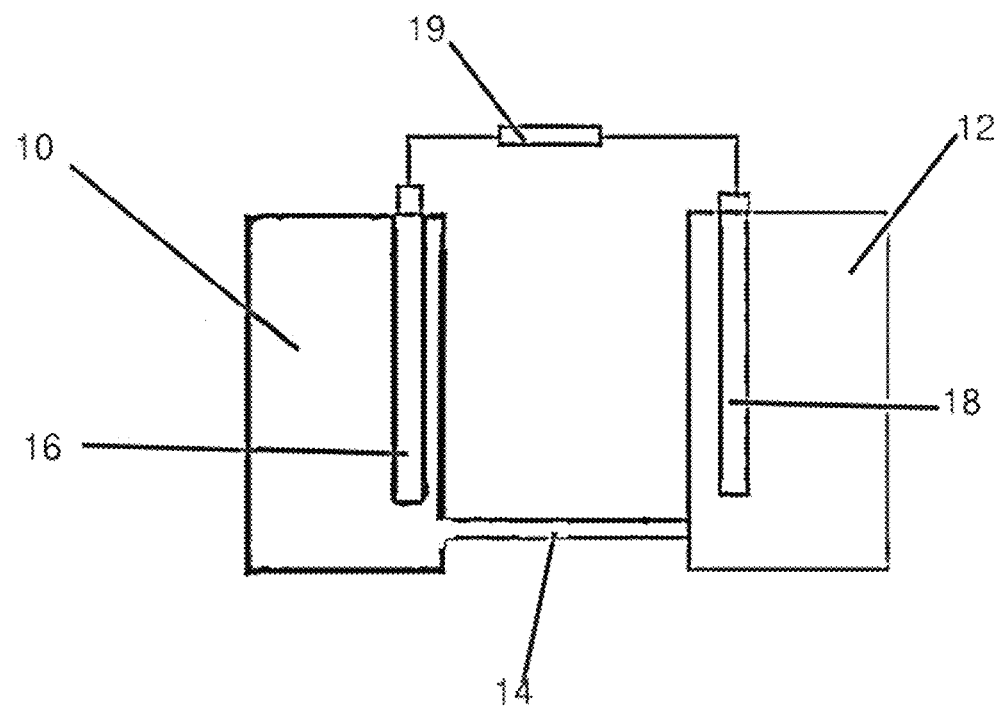
FIG. 2 is a view of a concentration cell without a membrane.

FIG. 2 shows a new configuration for a concentration cell. This new configuration contains tanks 10 and 12. Tanks 10 and 12 are attached by a channel 14. Channel 14 does not contain a membrane. Tank 10 is filled with a liquid of high concentration. Tank 12 is filled with a liquid of low concentration. In tank 10 an electrode 16 is placed. In tank 12, an electrode 18 is placed. When electrodes are attached to a load, 19 electricity will flow between the two electrodes 16 and 18 until the concentrations of both tanks are equal.

Figure 3:
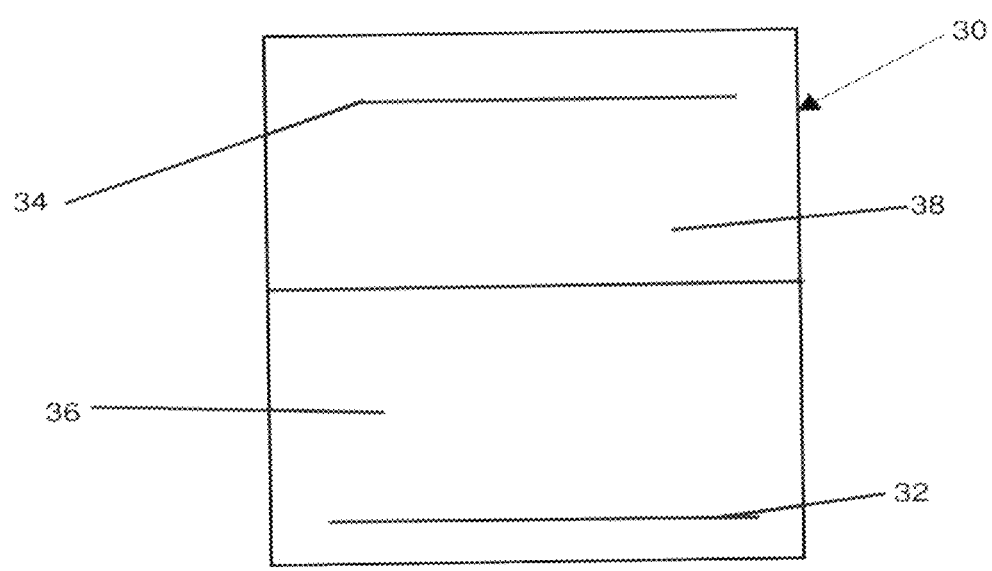
FIG. 3 is a view of another embodiment of a concentration cell without a membrane.

FIG. 3 shows another new configuration for a concentration cell. In this concentration cell, there is a single tank 30. An electrode 32 is placed at the bottom of the tank 30. An electrode 34 is placed at the top of the tank 30. A heavily concentrated solution 36 is placed at the bottom of the tank 30. The heavily concentrated solution 36 is denser than a lightly concentrated solution 38 that is placed on top of the heavily concentrated solution 36. Thus, the heavily concentrated solution 36 will stay at the bottom of the tank 30 and only slowly diffuse into the lightly concentrated solution 38 placed on top of the heavily concentrated solution 36. The bottom electrode 32 is within the heavily concentrated solution 36. The top of electrode 34 is within the lightly concentrated solution 38. When the electrodes 34 and 32 are attached to a load, electricity will flow. There are many types of salts and solvents that can conduct electricity and perform this type of concentration cell. In the preferred embodiment, salt water and fresh water are used. However, there are numerous salts, solutes, and solvents that are known in the art that can form this type of concentration cell.

Figure 4:
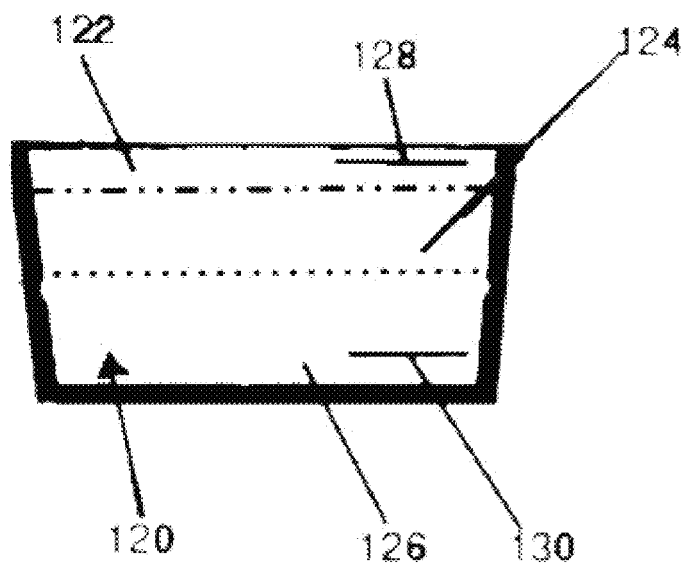
FIG. 4 is a cutaway view of a solar pond that produces electric.

FIG. 4 is a cutaway view of a solar pond 120. Solar ponds 120 consists of 3 layers. Layer 122 is the top layer. This consists of fresh water with a very low concentration of salt.

The second layer, layer 124, is a layer of water whose salt concentration gets higher as one goes to a deeper depth. The third layer, layer 126, is a layer of highly concentrated salt water. The third layer 126 salt concentration is around 20%. Electrodes 128 and 130 are placed at varying depth in the solar pond 120. In the preferred embodiment, electrode 128 is placed in layer 122. Another electrode 130 is placed in layer 126. Since the concentration of salt in the water around electrodes 128 and 130 varies if these electrodes are attached to a load, electric will flow. The electrodes 128 and 130 do not have to be placed in layer 122 and layer 126. They can be placed anywhere in the solar pond as long as the concentration of the water around electrodes 128 and 130 differs.

Figure 5:
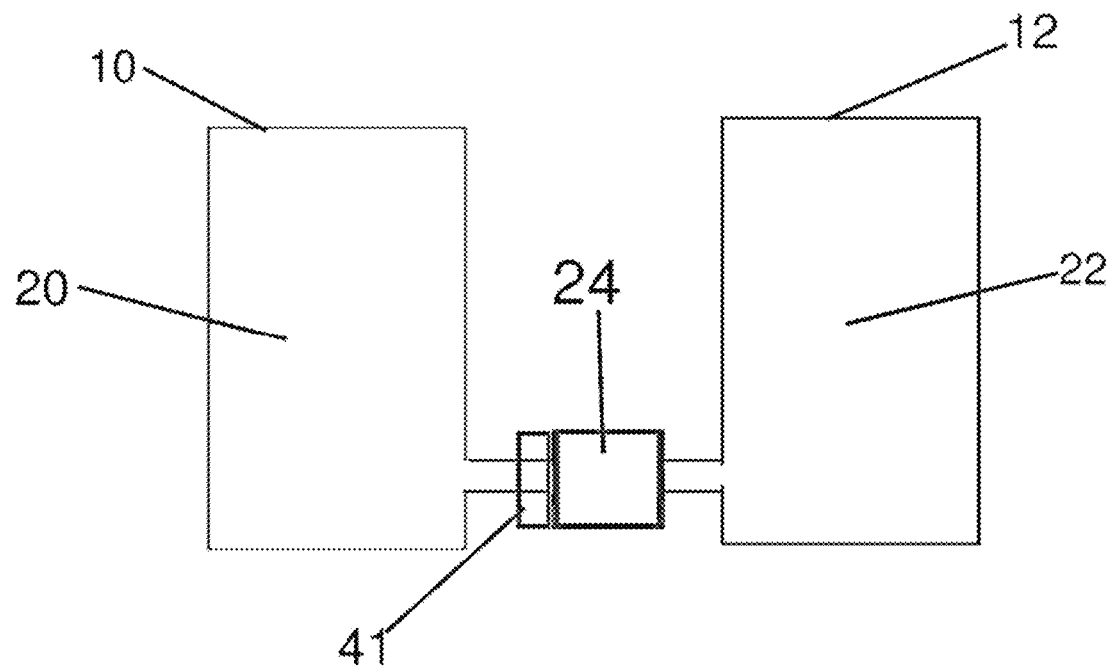
FIG. 5 is a view of a concentration cell that is a rechargeable battery.
Figure 6:
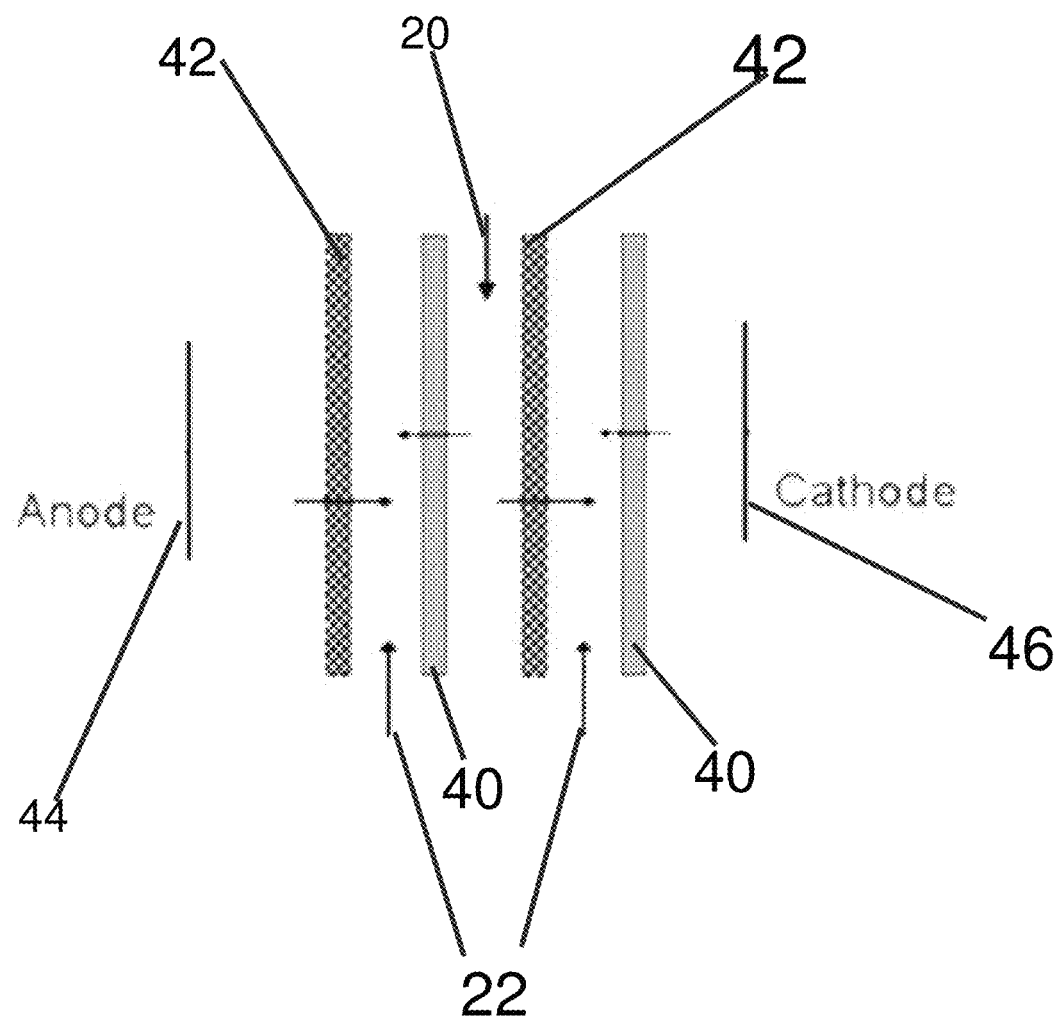
FIG. 6 is a view of an electrodialysis cell that is being charged.
Figure 6A:
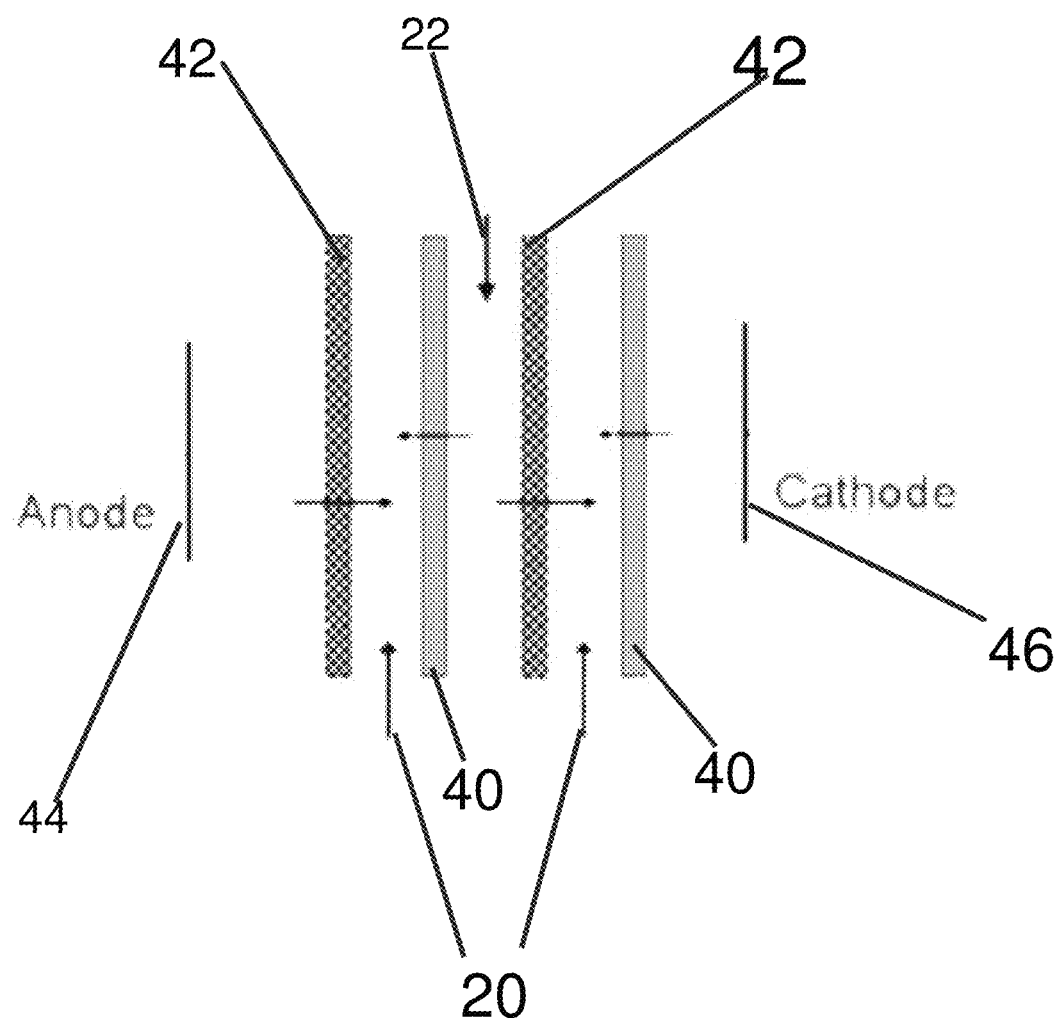
FIG. 6A is a view of an electrodialysis cell that is being discharged.

FIG. 5 shows an invention that allows a concentration cell to become a rechargeable battery. In FIG. 5 it shows tanks 10 and 12. Tank 10 has a high concentration liquid 20, and tank 12 has a low concentration liquid 22. The liquids 20 and 22 are able to pass from one tank to the other through an electrodialysis cell 24. FIGS. 6 and 6A show the electrodialysis cell 24. Electrodialysis cell 24 has several ion-exchange membranes 40 and 42, as shown in FIGS. 6 and 6A. The ion-exchange membranes are of two types, an anion exchange membrane 40 and cation exchange membrane 42. FIG. 5 also shows a pump and valve system 41. The pump and valve system 41 moves the high concentration liquid 20 and the low concentration liquid 22 through the appropriate cells.

To charge the cell, shown in FIG. 6, the low concentration liquid 20 and high concentration liquid 22 are allowed to flow through the appropriate cell compartments formed by the ion exchange membranes 40 and 42. Under the influence of an electrical potential difference, the negatively charged ions in the low concentration liquid 20 migrate toward the positively charged anode 44. These negatively charged ions pass through the positively charged anion exchange membrane 40 but are prevented from further migration toward the positive anode 44 by the negatively charged cation exchange membrane 42 and therefore stay in the high concentration liquid 22, which becomes more concentrated with the negatively charged ions. The positively charged ions in the dilute stream 20 migrate toward the negatively charged cathode 46 and pass through the negatively charged cation exchange membrane 42. These positively charged ions also stay in the highly concentrated liquid 22, prevented from further migration toward the negatively charged cathode 46 by the positively charged anion exchange membrane 40. As a result of electric current flowing between the cathode and anode, the positive and negative ions migrate. The overall result of the electrodialysis process is an ion concentration increase in the highly concentrated liquid 22 with a depletion of ions in the low concentrated liquid 20.

To produce electric, the low concentration liquid 20 and high concentration liquid 22 are allowed to flow through the appropriate cell compartments formed by the ion exchange membranes 40 and 42, as shown in FIG. 6A. However, since there is no electric passing through the cell, the ion from the low concentration liquid 20 will flow into the high concentration liquid 22 attempting to equalize the concentration of the high and low concentration liquids 20 and 22. This will create a flow of positive ions to flow towards the positive charged anode 44 and the negatively charged ions towards negatively charged cathode 46 causing a flow of current through the cell.

This invention can produce low cost energy storage. Almost any type of salt can be used. Such as common table salt. Thus, an individual in his home could store the energy from solar cells on his roof with the use of just water and common table salt. Any compound that is ionic in a solution can be used to store energy with the invention. This includes ammonium water solutions, acid water solutions, carbon dioxide water, and chlorine water solutions.

FIG. 5A shows another embodiment of the invention, which allows a concentration cell to become a rechargeable battery. FIG. 5A shows tanks 10 and 12. Tank 10 has a high concentration liquid 20, and tank 12 has a low concentration liquid 22. The liquids 20 and 22 can pass from one tank to the other through channel 47. In channel 47, there is a semi pervious membrane 15, pump 43, and a valve 49. In tank 10 there is electrode 51, and in tank 12 is electrode 53. Electric flows between the electrode when valve 49 is open, and the pump 43 is not running because the low concentration liquid 22 will flow through the semi pervious membrane 15 and into tank 10. To charge the cell pump, 43 pump the high concentrated liquid 20 through the semi pervious membrane 15. Since only the solution can go through the semi pervious membrane 15, the low concentration liquid 20 becomes less concentrated, and the high concentration liquid becomes more concentrated.

Figure 7:
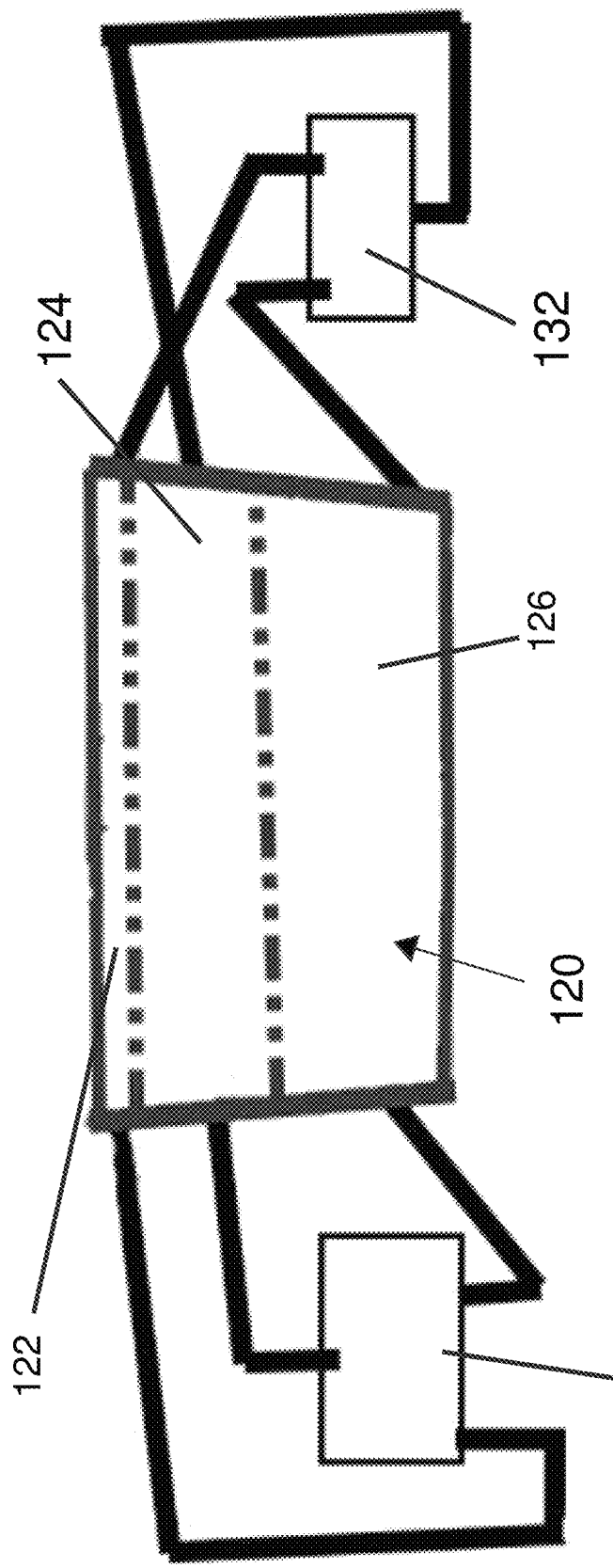
FIG. 7 is a view of a solar pond that is being used as a rechargeable battery.
Figure 7A:
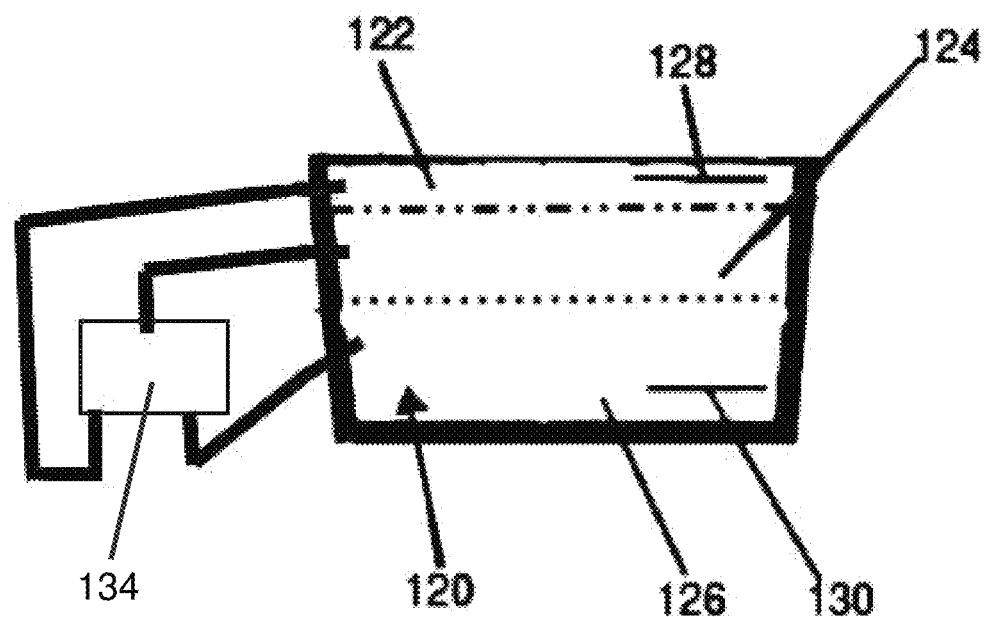
FIG. 7A is a view of another embodiment of a solar pond that is being used as a rechargeable battery.

The solar pond 120 can also be transformed into a rechargeable battery. This is shown in FIGS. 7 and 7A. In FIG. 7, the solar pond 120 and two electrodialysis cells 132 and 134 attached to the solar pond 120. Electrodialysis cell 132 takes the low concentration liquid from layer 122 and the high concentration liquid from layer 126 and directs them through the appropriate cell compartments formed by the ion exchange membranes and produces electric power as described above. The resulting liquid is now a medium concentration liquid. The medium concentration liquid is directed into layer 124. Electrodialysis cell 134 using electric power takes the medium concentration liquid from layer 124 and direct it through the appropriate cell compartments formed by the ion exchange membranes to create low concentration liquid and direct it into layer 122. Electrodialysis cell 134 also from the medium concentration liquid produces high concentration liquid and directs it into layer 126.

FIG. 7A only has one electrodialysis cell 134. The embodiment in FIG. 7A is exactly like the embodiment in FIG. 4 with the inclusion of an electrodialysis cell 134. Electrodialysis cell 134 using electric power takes the medium concentration liquid from layer 124 and direct it through the appropriate cell compartments formed by the ion exchange membranes to create low concentration liquid and direct it into layer 122. Electrodialysis cell 134 also from the medium concentration liquid produces high concentration liquid and directs it into layer 126. The solar pond of FIG. 7A uses electric energy to perform this process.

The solar pond 120 of FIG. 7A produces energy just as the soar pond 120 of FIG. 4. Electrodes 128 and 130 are placed at varying depth in the solar pond 120. In the preferred embodiment, electrode 128 is placed in layer 122. Another electrode 130 is placed in layer 126. Since the concentration of salt in the water around electrodes 128 and 130 varies if these electrodes are attached to a load, electric will flow. The electrodes 128 and 130 do not have to be placed in layer 122 and layer 126. They can be placed anywhere in the solar pond as long as the concentration of the water around electrodes 128 and 130 differs.

Figure 7B:
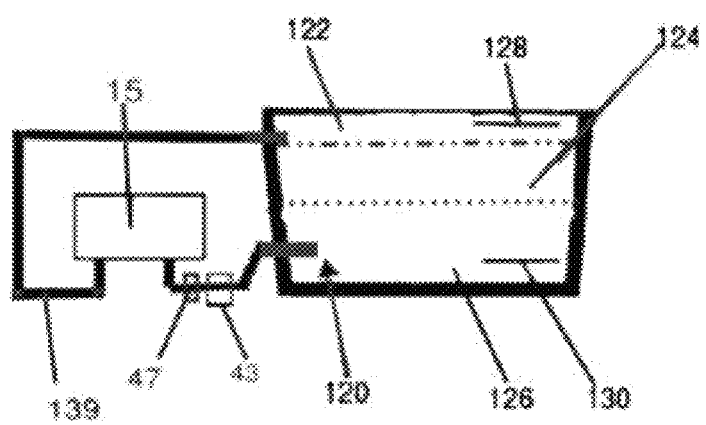
FIG. 7B is a view of another embodiment of a solar pond that is being used as a rechargeable battery.

The solar pond 120 can also be transformed into a rechargeable battery without an electrodialysis cell. This is shown in FIG. 7B. In FIG. 7B, the solar pond 120 has channel 139 running between the low concentration liquid from layer 122 and the high concentration liquid from layer 126. Within channel 139 is semi pervious membrane 15 and pump 43 and value 47. To charge the solar pond 120 valve 47 is opened and pump 43 pumps the high concentrated liquid from layer 126 through the semi pervious membrane 15. Since only the solution can go through the semi pervious membrane 15 the low concentration liquid from layer 122 becomes less concentrated, and the high concentration liquid from layer 126 becomes more concentrated. To discharges the pond, the electrodes 128 and 130 are hooked across a load.

Figure 8:
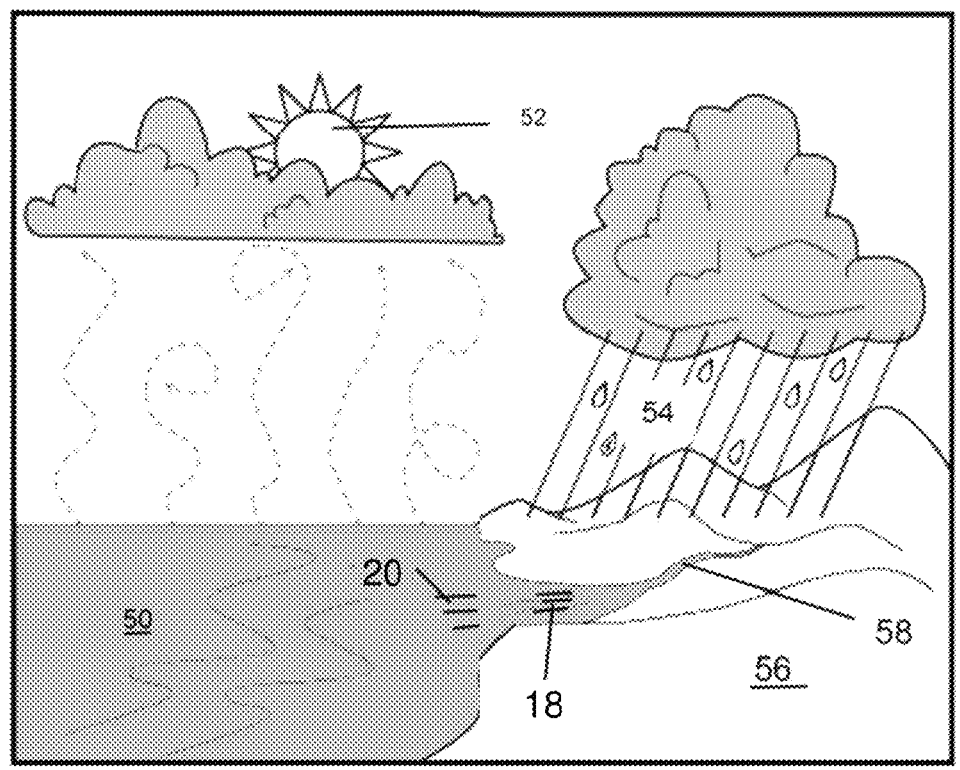
FIG. 8 is a representative diagram of the cycle that occurs in nature that has been modified to produce electric.

FIG. 8 is a representative diagram of the cycle that occurs in nature. In this diagram, we have ocean 50. Solar energy from the sun 52 is absorbed by the ocean 50. This causes some of the water in the ocean 50 evaporate. This water forms clouds and rains 54 on the land 56. The water from the rain 54 runs into river 58, and the water in the river 58 runs into the ocean 50. Electrodes 18 have been in placed in a river 58. Electrodes 20 have been placed in the ocean 50. When the electrodes 20 and 18 are attached to a load, electric will flow between the electrodes. To place this electric on the grid, the electrodes 20 and 18 would need to be attached to an inverter to change the DC electric flowing between the electrodes into AC electric for the grid.

Figure 9A:
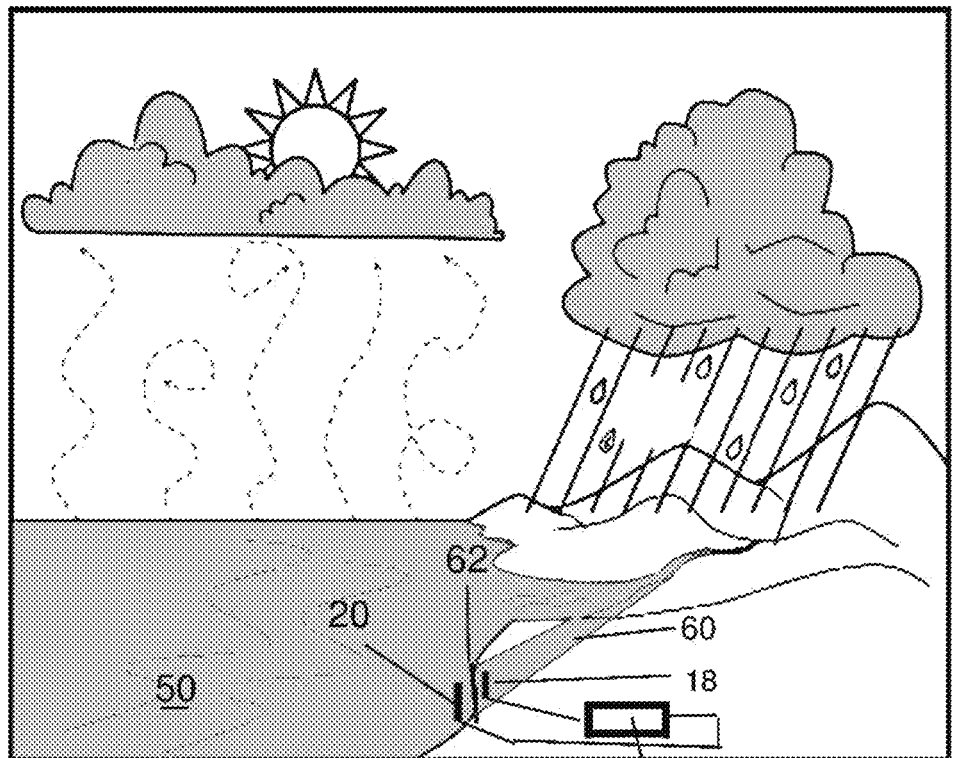
FIG. 9A is another embodiment of a representative diagram of the cycle that occurs in nature that has been modified to produce electric.
Figure 9B:
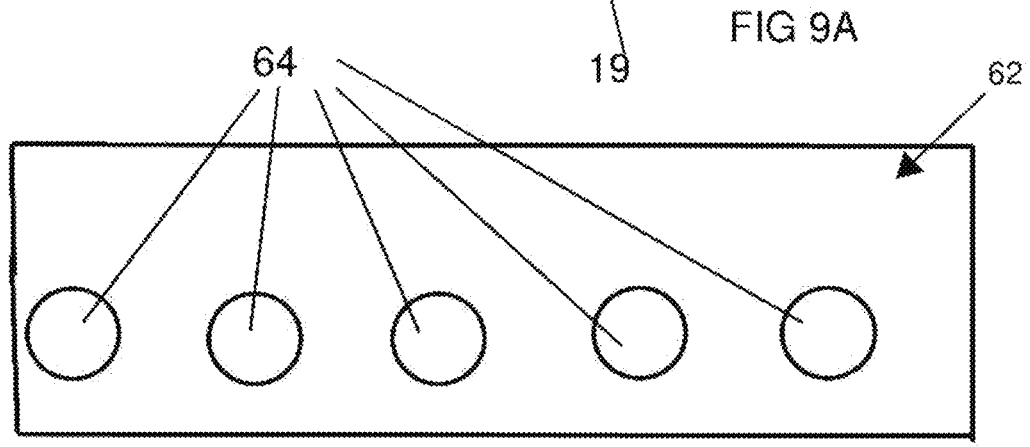
FIG. 9B is a view of the wall of FIG. 9A.

Another embodiment of the invention shown in FIG. 9A. FIG. 9A shows a river being diverted into a basin 60, whose one side borders the ocean 50. Along this side there is a wall 62. Within the basin 60 is a set of electrodes 18. Out past the wall 62 in the ocean 50 is another set of electrodes 20. FIG. 9B shows the configuration of the wall 62. The wall 62 below the waterline has a set of openings 64 that allows water to flow from the basin 60 to the ocean 50. When the electrodes 18 and 20 are attached to a load 19 electric will flow between the electrodes 18 and 20. In order to place this electric on the grid, the electrodes 18 and 20 would need to be attached to an inverter to change the DC electric flowing between the electrodes 18 and 20 into AC electric for the grid.

Figure 9C:
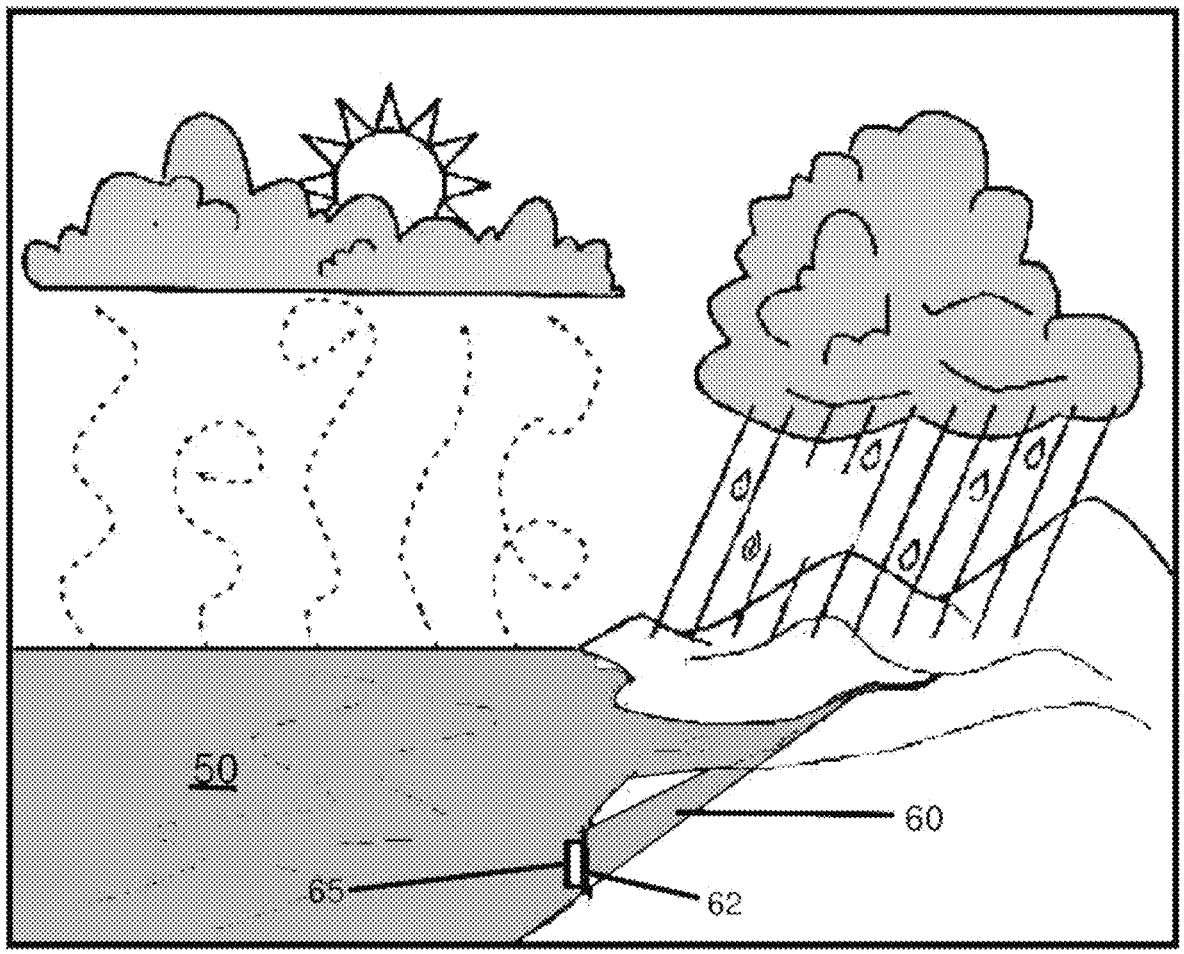
FIG. 9C is another embodiment of a representative diagram of the cycle that occurs in nature that has been modified to produce electric using turbines.
Figure 9D:
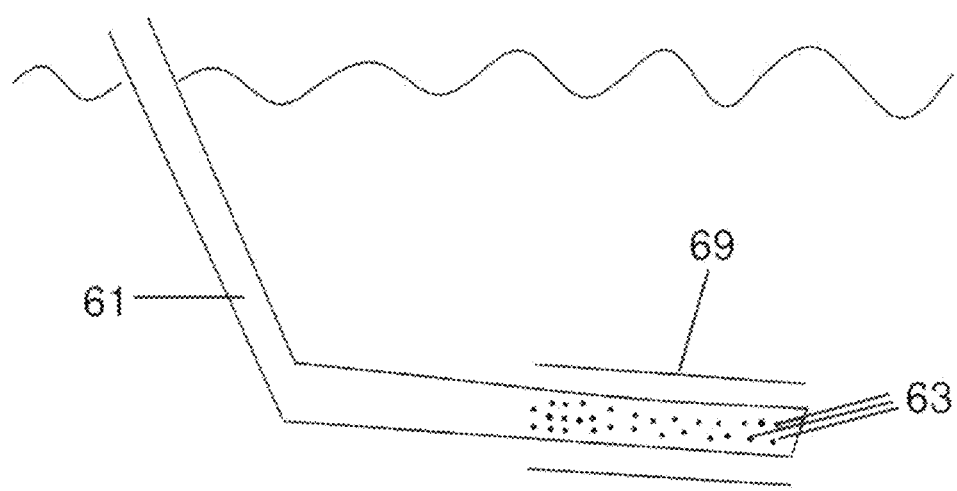
FIG. 9D is another embodiment of the invention showing a pipe carrying water of low salinity into a basin of high salinity.

The embodiment of FIG. 9C is similar to the embodiment of 9A and 9B except that the embodiment of FIG. 9C uses turbines to produce electrical energy. FIG. 9C shows a river being diverted into a basin 60, whose one side borders the ocean 50. Along this side there is a wall 62. Wall 62 is exactly like the wall 62 in FIG. 9B. The wall 62 below the waterline has a set of openings 64 that allows water to flow from the basin 60 to the ocean 50. At openings 64 turbines 65 are placed. As the water flows from the basin 60 to the ocean 50 through openings 64, the water will flow through turbine 65 producing electric. The energy of the water flowing through the turbine will be greater than the energy from the flow of the river due to the salt gradient (osmotic energy).

Figure 9E:
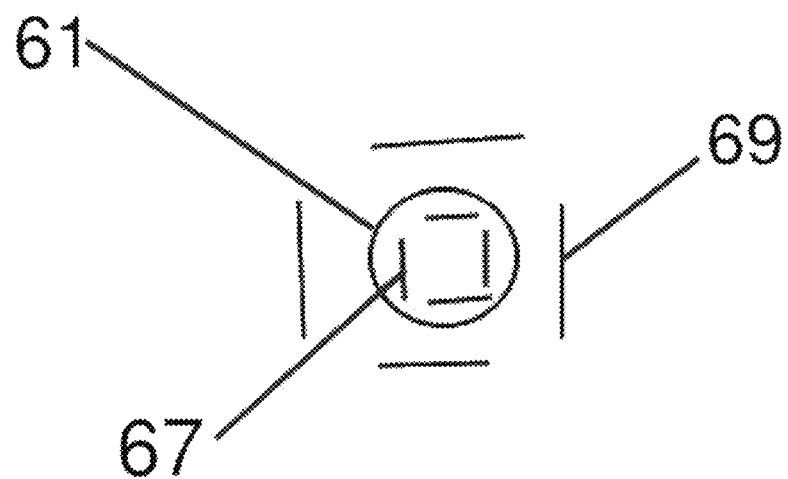
FIG. 9E shows the configuration of the electrodes of the embodiment of 9D.
Figure 9G:
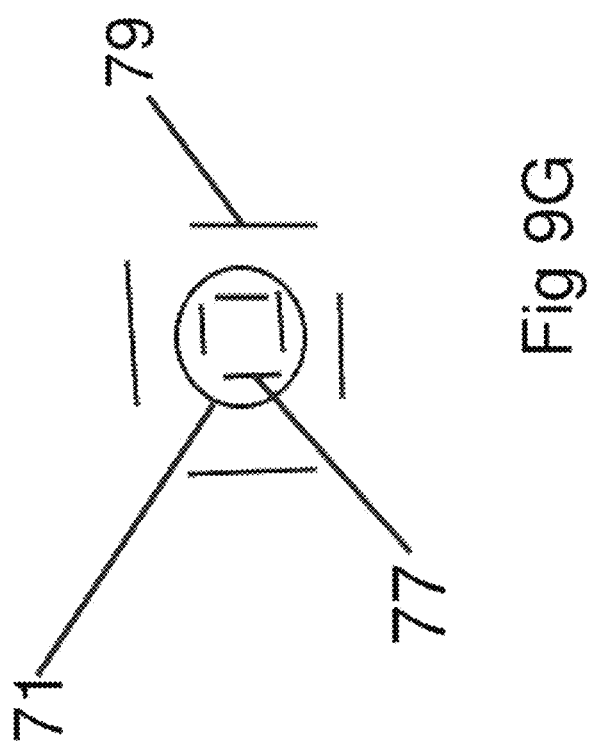
FIG. 9G shows the configuration of the electrodes of the embodiment of 9F.
Figure 9H:
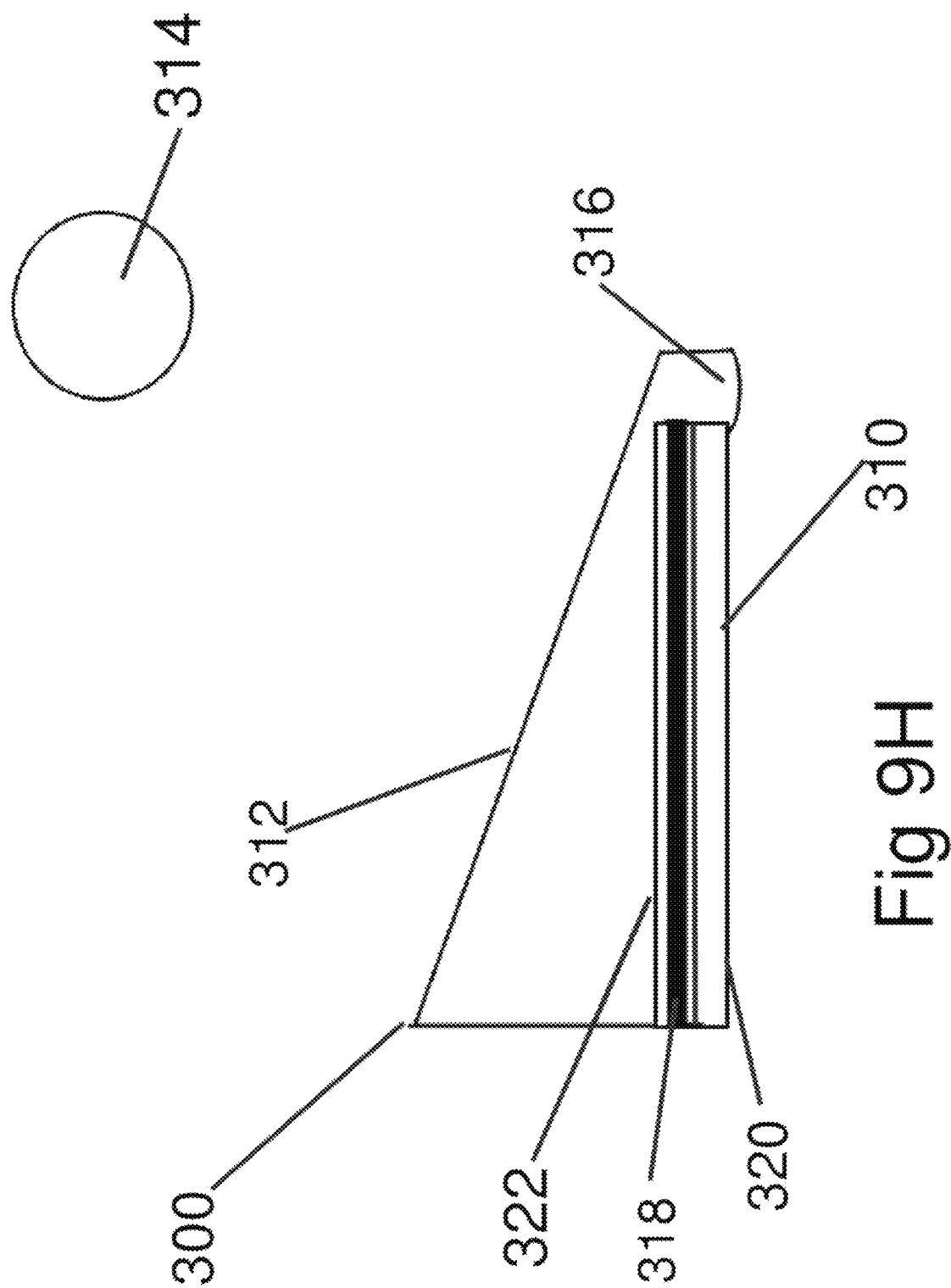
FIG. 9H is a view of a solar still that uses forward osmosis to produce electric.
Figure 9I:
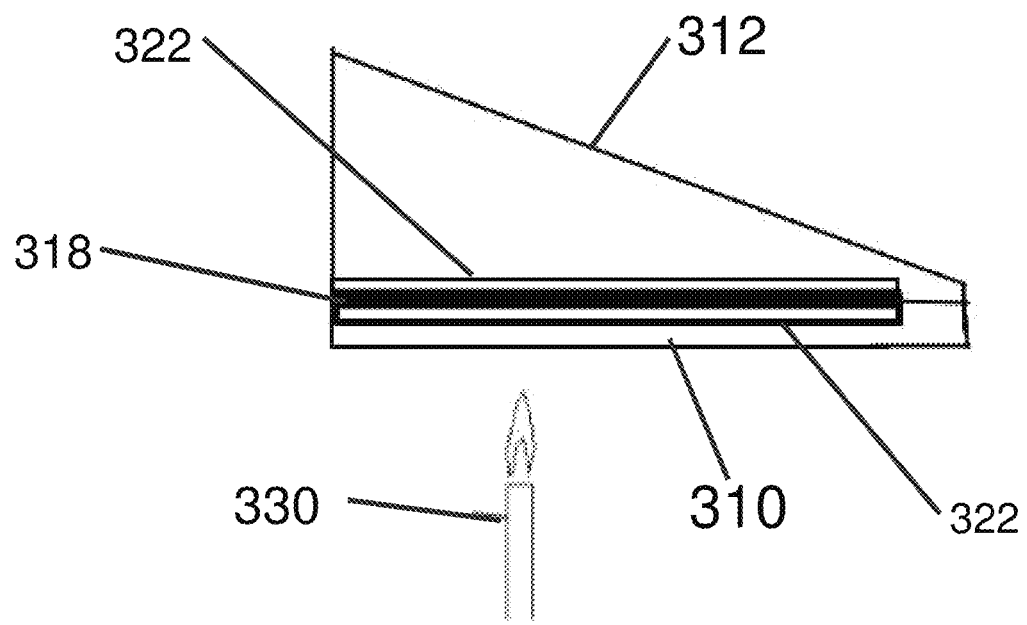
FIG. 9I is a view of a still that uses forward osmosis to produce electric from heat.
Figure 9:
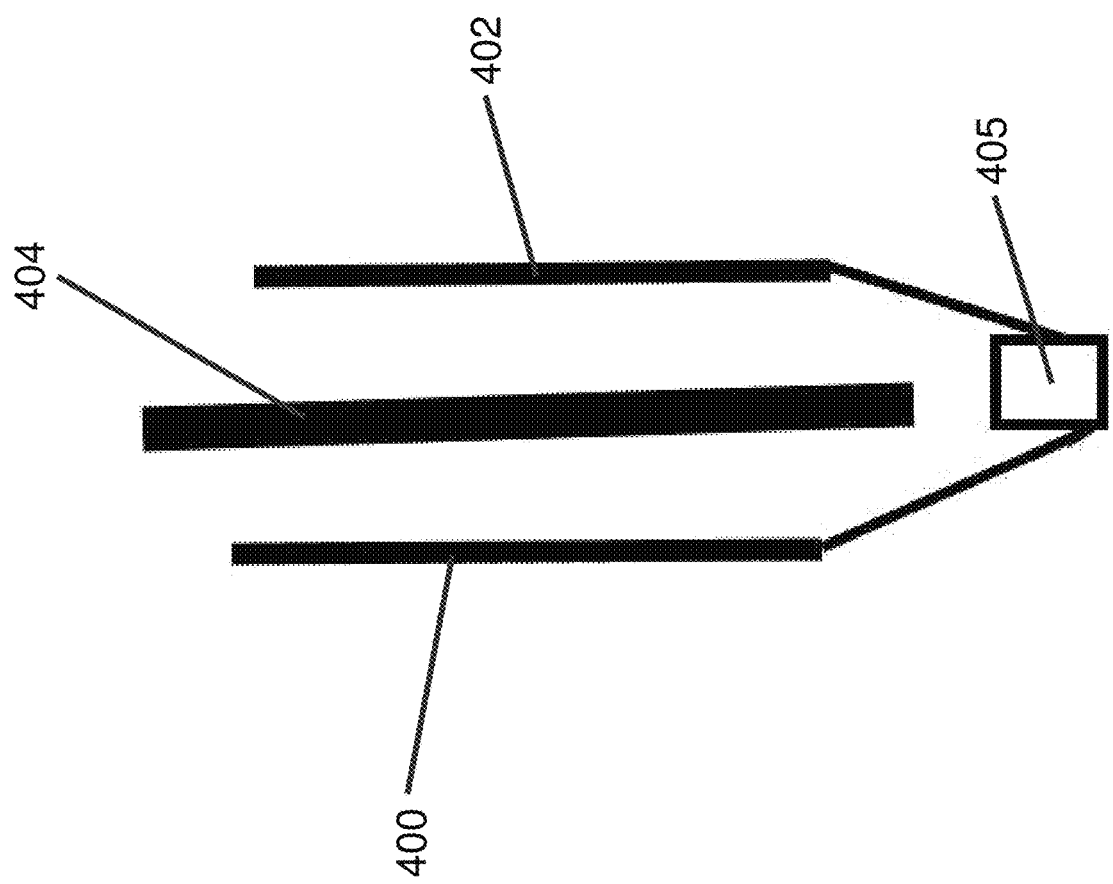
FIG. 9F is another embodiment of the invention showing a pipe carrying water of high salinity into a basin of low salinity.
FIG. 9J is a view of the membrane used in forward osmosis with electrodes on each side.
FIG. 9K is a view of a heat engine using forward osmosis.
FIG. 9L is a view of a forward osmosis process to desalinate salt water and produce electric.
Figure 9:
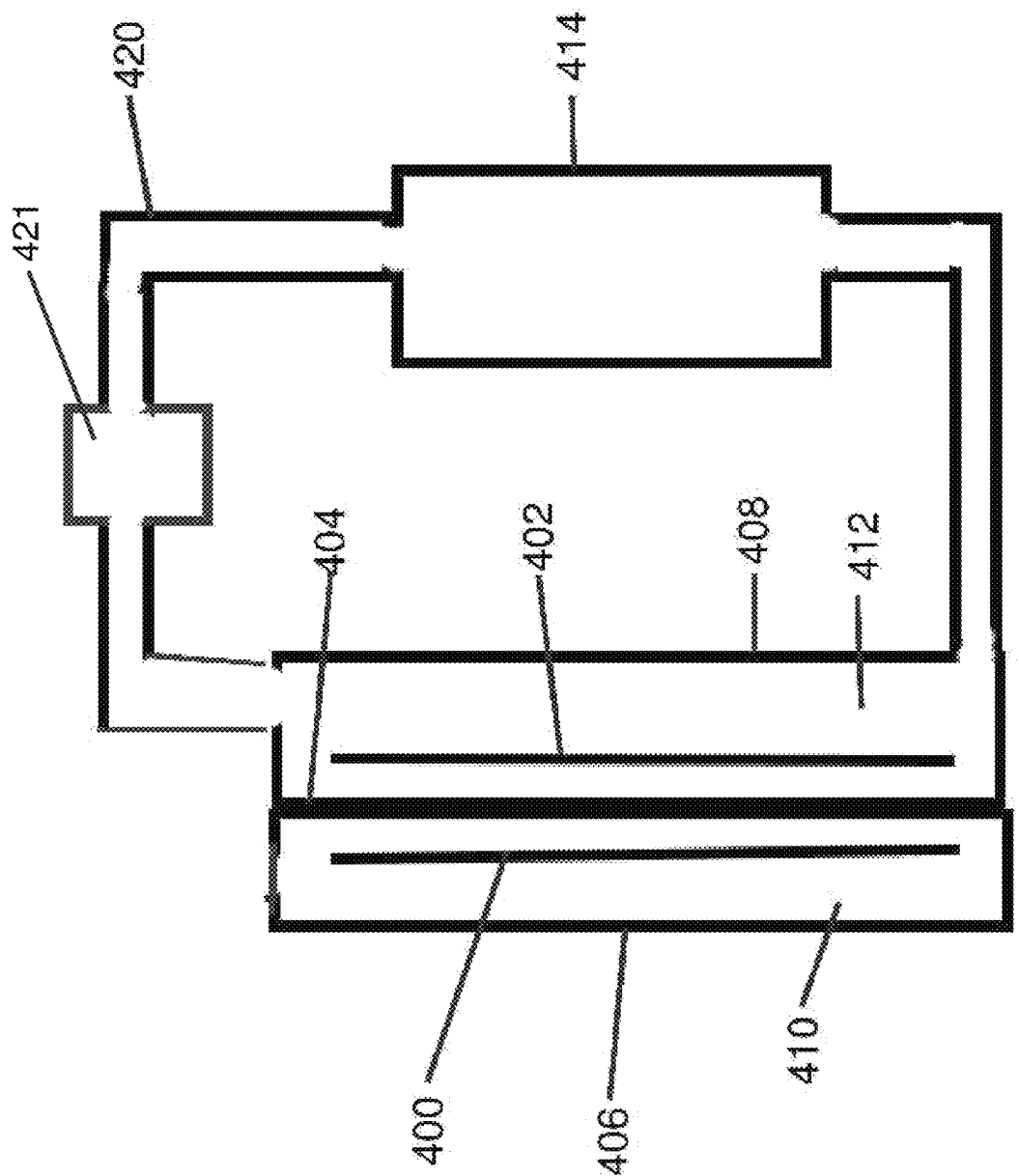

FIG. 9 D shows another embodiment of this invention. This embodiment is similar to the embodiments of FIGS. 8 and 9A, 9b, and 9C. This embodiment shows a pipe 61 running into the ocean 50. Through the pipe 61 fresh water flows. The source of the freshwater could be a river or any other source of fresh water. The pipe 61 extends into a source of high salinity water or the ocean 50. Once the pipe 61 enters ocean 50, it has a set of openings 63 in its side. The openings 63 allow the freshwater in the pipe to flow into the ocean 50. The freshwater has a lower salinity than the ocean water, and the fresh water will flow into the ocean water. Within the pipe 61 near the openings 63 is a set of electrodes 67. These electrodes 67 are in the fresh water coming through the pipe. Outside the pipe near the openings 63 is a set of electrodes 69. These electrodes 69 are in the ocean 50. A configuration of electrodes 67 and 69 are showing in FIG. 9E, an end view of pipe 61. Electrodes 67 can be placed anywhere within the pipe as long as the salinity of the water in which the electrodes 67 are located is less than the salinity of the ocean 50. Electrodes 69 can be placed anywhere outside the pipe 61 as long as they are near the openings 63 and are in ocean 50 water that has a higher salinity than the water in the pipe. If electrodes 67 and 69 are attached together to a load, electric will flow.

FIG. 9F shows an embodiment of the invention that is similar to the embodiment in FIG. 9 D except that the source of water running in the pipe 71 has a higher salinity than the water in the ocean 50 or basin. This could be water from a desalination plant or a sewage treatment plant. Once pipe 71 enters the basin, pipe 71 has a set of openings 73. In this embodiment, pipe 71 has an open bottom. In this embodiment, the water flowing through the pipe has a higher salinity than the water in the ocean 50, and thus, the water from the ocean 50 flows through the openings 73 into the pipe 71. Similar to the electrodes 67 and 69 in the previous embodiment electrodes 77 are placed within the pipe 71, and electrodes 79 are placed outside the pipe 71. Electrodes 77 can be placed anywhere within the pipe 71 as long as the salinity of the water around electrodes 77 is higher than the water around electrodes 79. Electrodes 79 can be placed anywhere outside the pipe 71 near openings 73 as long as the water around electrodes 79 has a lower salinity than the water around electrodes 77. A configuration of electrodes 77 and 79 are showing in FIG. 9G, an end view of pipe 71. If electrodes 77 and 79 are attached together through a load, electricity will flow.

In many bodies of salt water, the concentration of the salt in the water varies at varying depth. Thus, if electrodes are placed at differing depth where the salts concentration is different and the electrodes are attached through a load, electric will flow between the electrodes.

FIG. 9H shows the use of forward osmosis to produce a solar still 300 and electric. The solar still 300 comprises a tub 310 of water and a transparent covering 312. The sun 314 shines on the water causing it to evaporate. The evaporate water collects of the transparent covering 312 and condenses. The condensed water flows down the transparent covering 312 and into a trough 316. To produce electric a membrane 318 is placed on top of the water. The membrane 318 has an electrode 320 on its bottom and electrode 322 on its top. The membrane 318 becomes saturated with water. Salt is placed on the top of the membrane 318. If the water on the top of the membrane 318 has a higher salt concentration than the water below the membrane 318, the water beneath the membrane 318 will pass through the membrane 318 to the top of the membrane 318. The sun 314 will heat the water on top of the membrane 318 causing it to vaporize. As stated above, this vaporize water will condense on the transparent covering 312 and flow into the trough 316. If electrodes 320 and 322 are hooked to a load, electric will flow.

FIG. 9I shows another configuration similar to the solar still 300 for a heat engine. In this configuration, instead of the sun 314 heating the water, a heat source 330 heats the water. As in FIG. 9H, the water passes through the membrane 318 and evaporates. The water then condenses on the transparent covering 312 and flows back into the water in the tub 310. As in the previous embodiment, electrodes 320 and 322 are attached to the top and bottom of the membrane 318. The membrane 318 becomes saturated with water. Salt is placed on the top of the membrane 318. If the water on the top of the membrane 318 has a higher salt concentration than the water below the membrane 318, the water beneath the membrane 318 will pass through membrane 318 to the top of the membrane 318. If electrodes 320 and 322 are hooked to a load, electric will flow.

Forward osmosis can be used to produce electrical energy. To produce electrical energy from forward osmosis, one places the electrodes 400 and 402 on each side of the membrane 404 and attaches the electrodes to a load 405. This is shown in FIG. 9J. When the low concentration liquid around electrode 400 flows through membrane 404, electric will pass through load 405. In FIG. 9 K a heat engine using forward osmosis is shown. In this FIG. 9 K, membrane 404 has electrodes 400 and 402 on each side. Also, on each side of the membrane 404 are chambers 406 and 408. The chambers 406 are filled with a low concentration liquid 410, and chamber 408 is filled with a high concentration liquid 412. The low concentration liquid 410 will flow through the membrane 404 into the high concentration liquid 412. When the low concentration liquid 410 flows through the membrane 404 electricity will flow between the electrodes 400 and 402. The high concentration liquid 412 then flows into chamber 414. Chamber 414 is heated, and the high concentration liquid in chamber 414 is heated to a temperature where the solute in the high concentration liquid change into a gas, but the temperature is lower than the boiling point of the solvent and the solute is driven off. The vapor from the solute of the high concentration liquid is running through a turbine generator 421 to product addition power. The vapor passes through tubing 420 and into chamber 408 and is reabsorbed by the high concentration liquid 412 in completing the cycle.

Figure 9L:
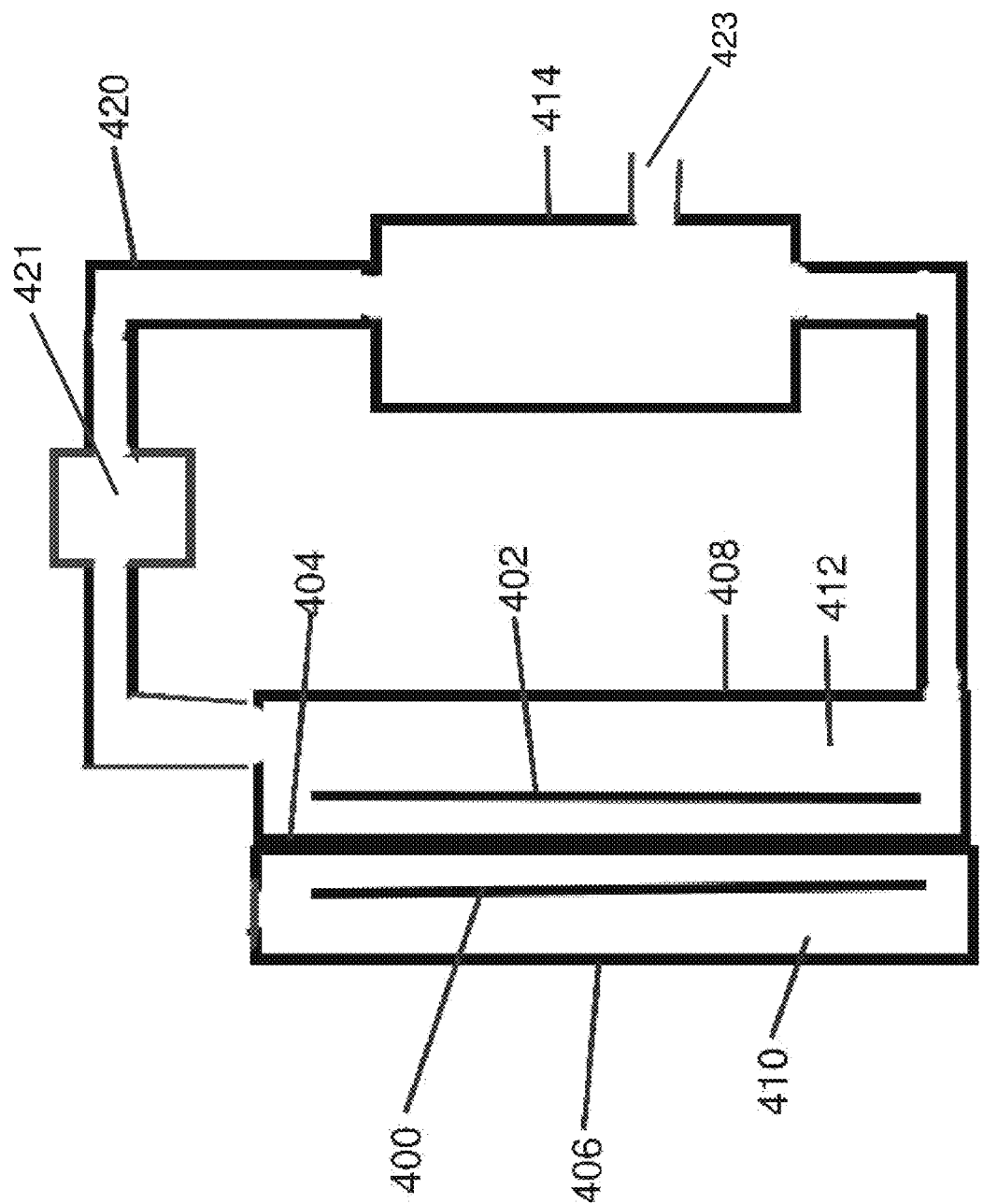

Forward osmosis system as in the above embodiment can also be used to desalinate salt water. To produce fresh from forward osmosis, one places the electrodes 400 and 402 on each side of the membrane 404 and attaches the electrodes to a load 405. This is shown in FIG. 9L. The salt water is placed in chamber 406. A liquid of higher concentration 412 is placed in chamber 408.

The liquid of higher concentration contains a solute that, when heated, will change into a gas at a temperature lower than the boiling point of water. The water or solvent in the salt water around electrode 400 flows through membrane 404, and electric will pass through load 405. The high concentration liquid 412 into which the water has flown than moves into chamber 414. Chamber 414 is heated, and the solute in the high concentration liquid is driven off. The vapor from the solute can be run through a turbine generator 421 to product addition power. The water is then collected through drain 423.

Figure 10:
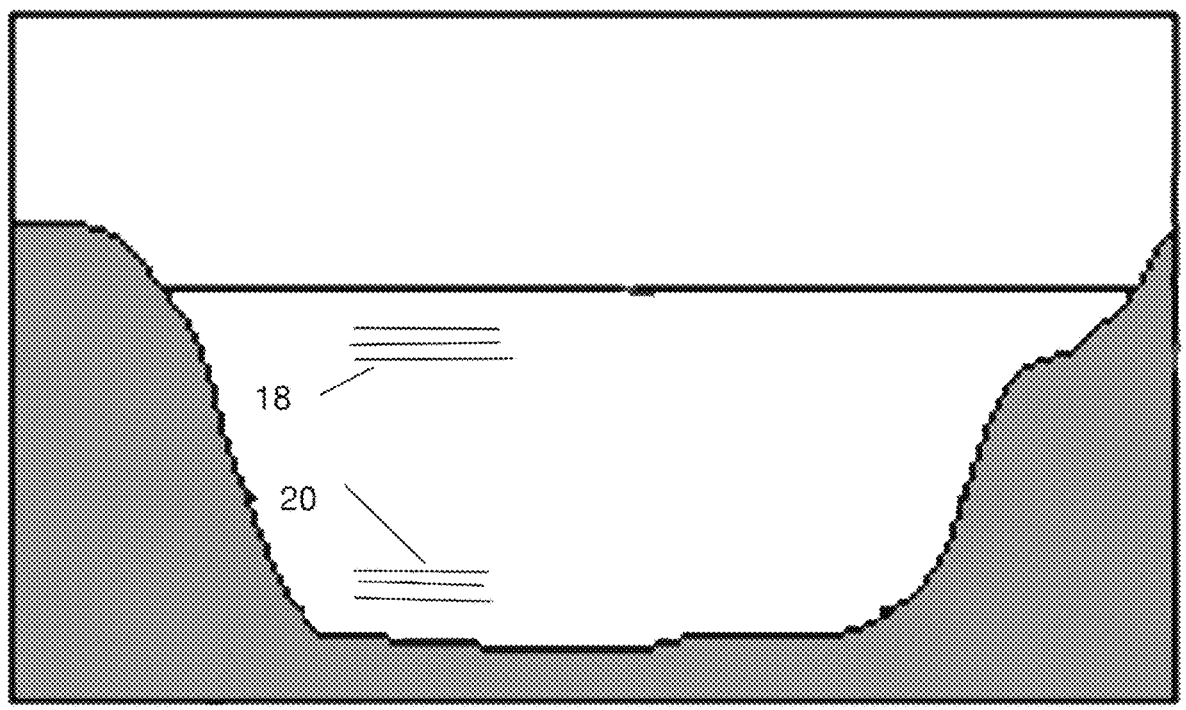
FIG. 10 is a cutaway view of a pond with electrodes at differing depth.

FIG. 10 is a cutaway view of a body of water showing that the salt concentration varies with depth. Electrode 18 is placed near the top of the body of water, and electrode 20 is placed near the bottom. The electrodes 18 and 20 can be placed anywhere in the body of water as long as the salt concentration around electrode 18 differs from the salt concentration around electrode 20. When electrodes 18 and 20 are attached together through a load, electric flows between electrodes 18 and 20.

In Nernst's equation, not only the salt concentration but also the temperature affects the amount of electric that flows. Thus, the electric flowing between the two electrodes 18 and 20 will be affected by the temperature.

It is not necessary to use water and salt. Any solvent and solute can be used. All that is necessary is to have two regions of differing concentrations and a flow of the lesser concentration into one of more concentration. If electrodes are placed in both regions and connected through a load, electric will flow between the electrodes.

Figure 11:
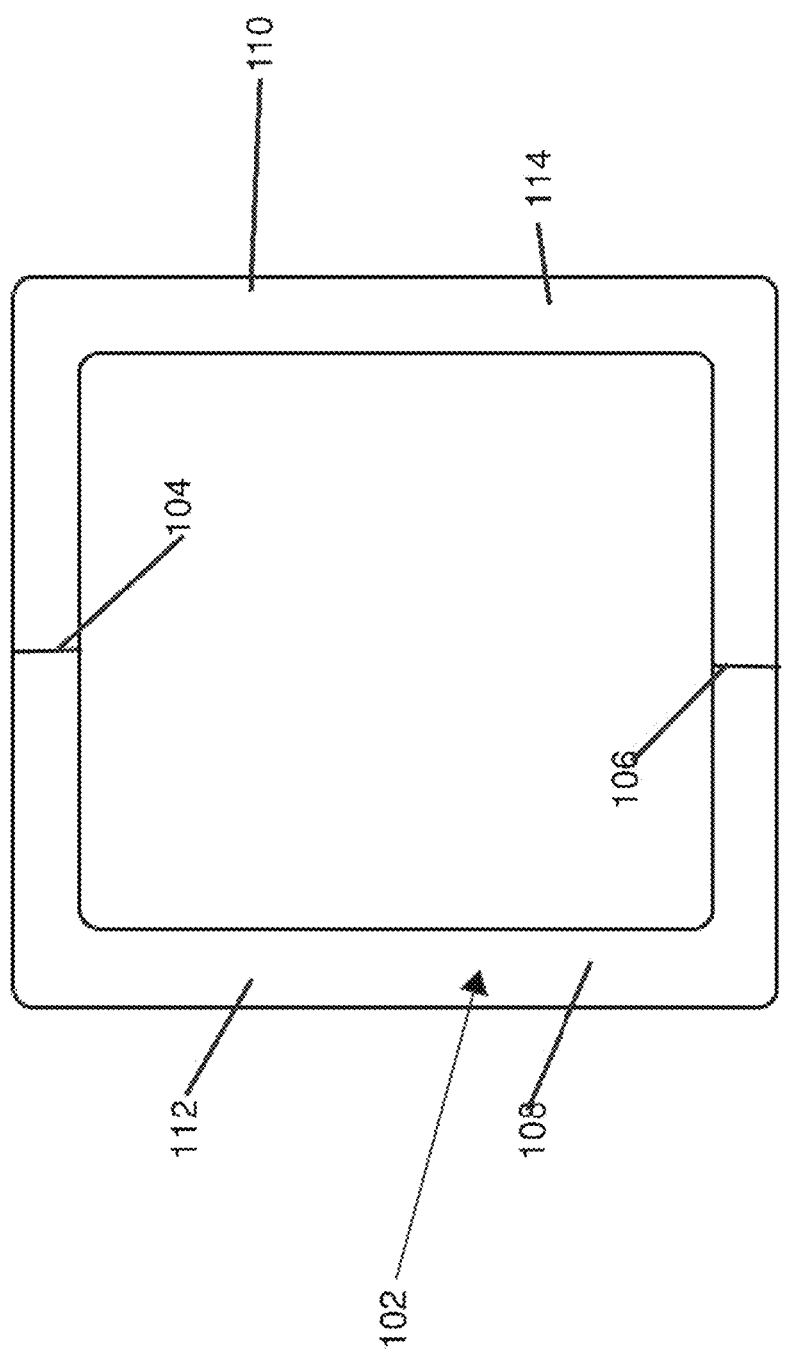
FIG. 11 is a view of an embodiment of a heat engine without the heat source.

FIG. 11 shows a tube forming an elongated loop 102. In the preferred embodiment of this invention, the tube would be an elongated rectangular loop 102. At the top of the loop 102, a semi-pervious membrane 104 is placed within the tube. At the bottom of the tube, another semi-pervious membrane 106 is placed. The semi-pervious membranes 104 and 106 divide the tube into two chambers 108 and 110. Each chamber 108 and 110 is completely filled with a liquid of different concentrations. In one chamber 108, the liquid 112 is of high concentration. In the other chamber 110, the liquid 114 is of low concentration. Liquid 114 of low concentrations flow into liquids 112 of high concentrations through semi-pervious membranes 104 and 106. However, if both ends of the loop are at the same temperature, the liquids of low concentration 114 will not flow into the liquid of a high concentration 112 since the osmotic pressure on each semi-pervious membrane 104 and 106 would be equal. This is shown in FIG. 11.

Figure 12:
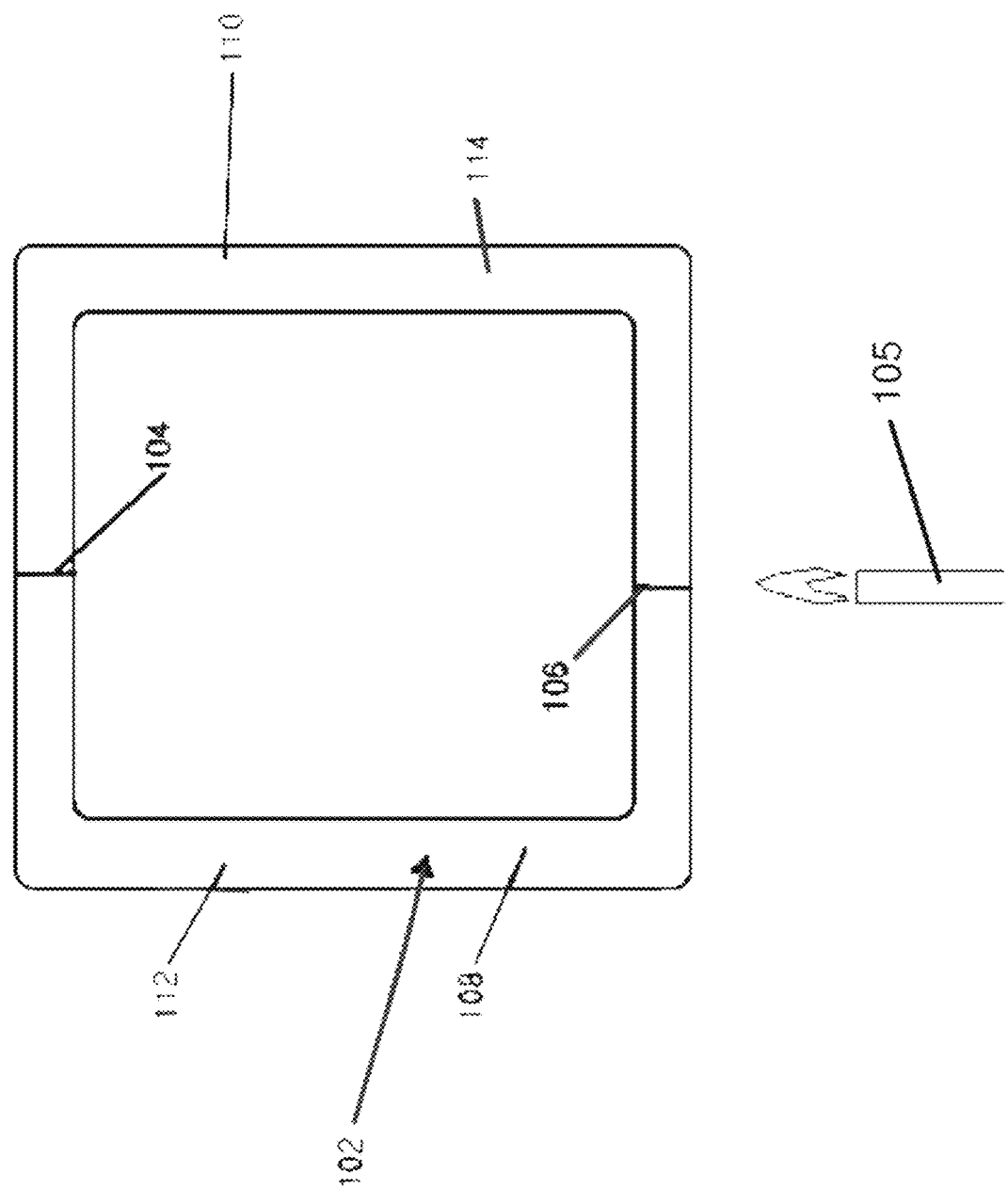
FIG. 12 is a view of the embodiment of a heat engine of FIG. 11 with the heat source.

In FIG. 12, a heat source 105 is shown heating the low concentration liquid 114 and high concentration liquids 112 around semi-pervious membrane 106 at the bottom of the loop 102. At the top of a loop 102, the liquids 112 and 114 and semi-pervious membrane 104 are being cool. Thus, the osmotic pressure on membrane 106 would be higher than the osmotic pressure on membrane 104 due to the temperature difference. The low concentration liquid 114 in loop 102 would then flow through the membrane 106. At membrane 104, the pressure from the high concentration liquid 112 flowing through membrane 104 would be greater than the osmotic pressure of the low concentration liquid 114 flowing through membrane 104. Therefore, reverse osmosis would occur. Consequently, the liquids 112 and 114 would flow through both semi-pervious membranes 104 and 106 and around the loop 102.

Figure 13:
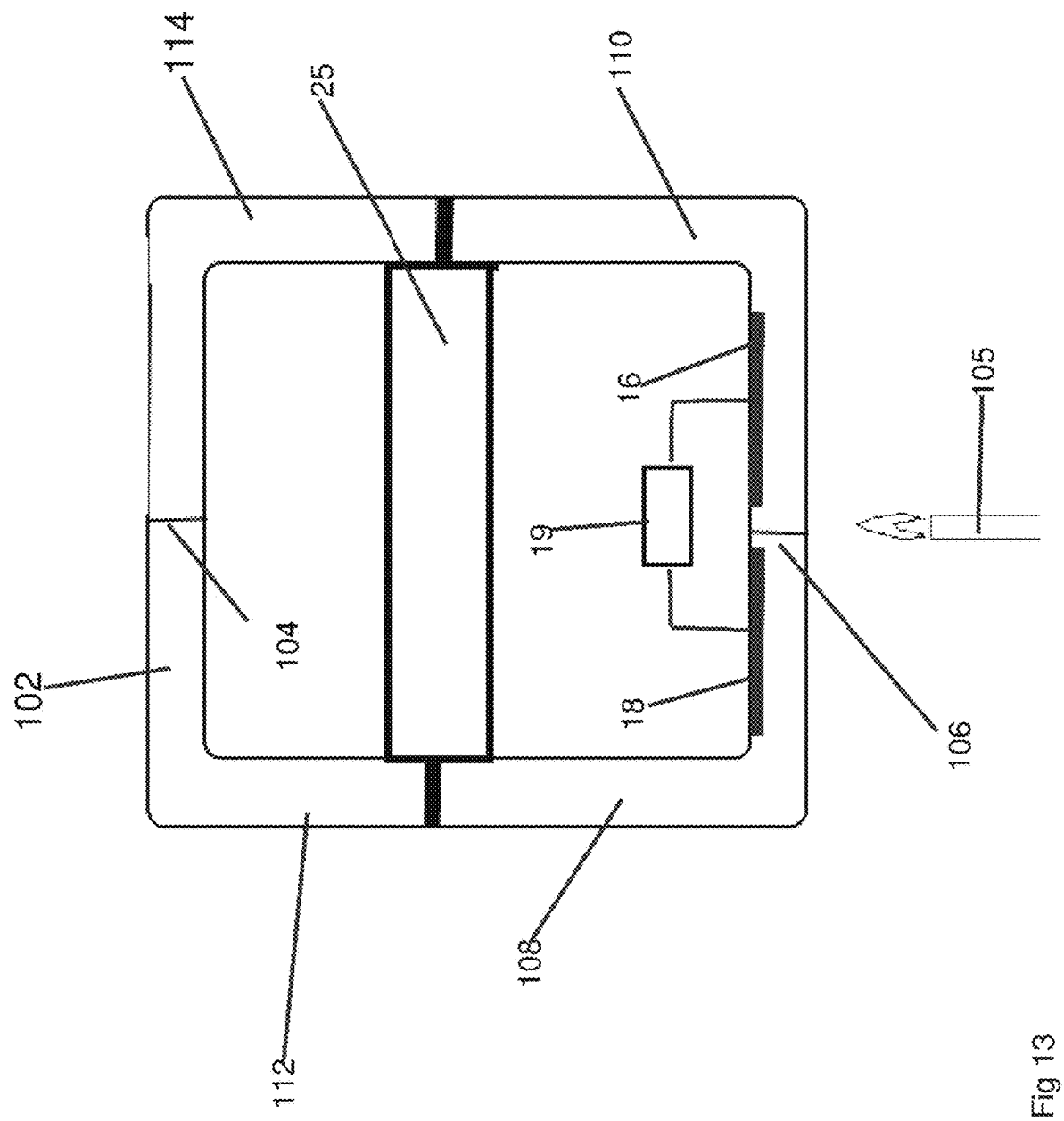
FIG. 13 is a view of the embodiment of a heat engine of FIG. 11 with the heat source and electrodes.

FIG. 13 is exactly as FIG. 12, except FIG. 13 has electrodes 16 and 18. When electrodes 16 and 18 are attached to a load 19 electricity will flow through the load 19. What has been created is a concentration cell. A concentration cell consists of a high concentration liquid and a low concentration liquid separated by a semi-pervious membrane. Electricity will flow between an electrode placed in the high concentration liquid and electrode placed in the low concentration. The electrode 16 and 18 can be placed anywhere as long as electrode 16 is in the high concentration liquid 114 and electrode 18 is in the low concentration liquid 112. In the preferred embodiment, FIG. 13 also contains a heat exchanger 25. The heavily concentrated liquid 114 would give up heat to the heat exchanger 25 as it rises, and the heat would be used to heat the low concentration liquid 112 as it moves towards membrane 106 and the heat. This device could be used to recover heat from any waste heat site, a solar pond, an ocean, a lake, or any source of heat or a source with a temperature difference.

Figure 14:
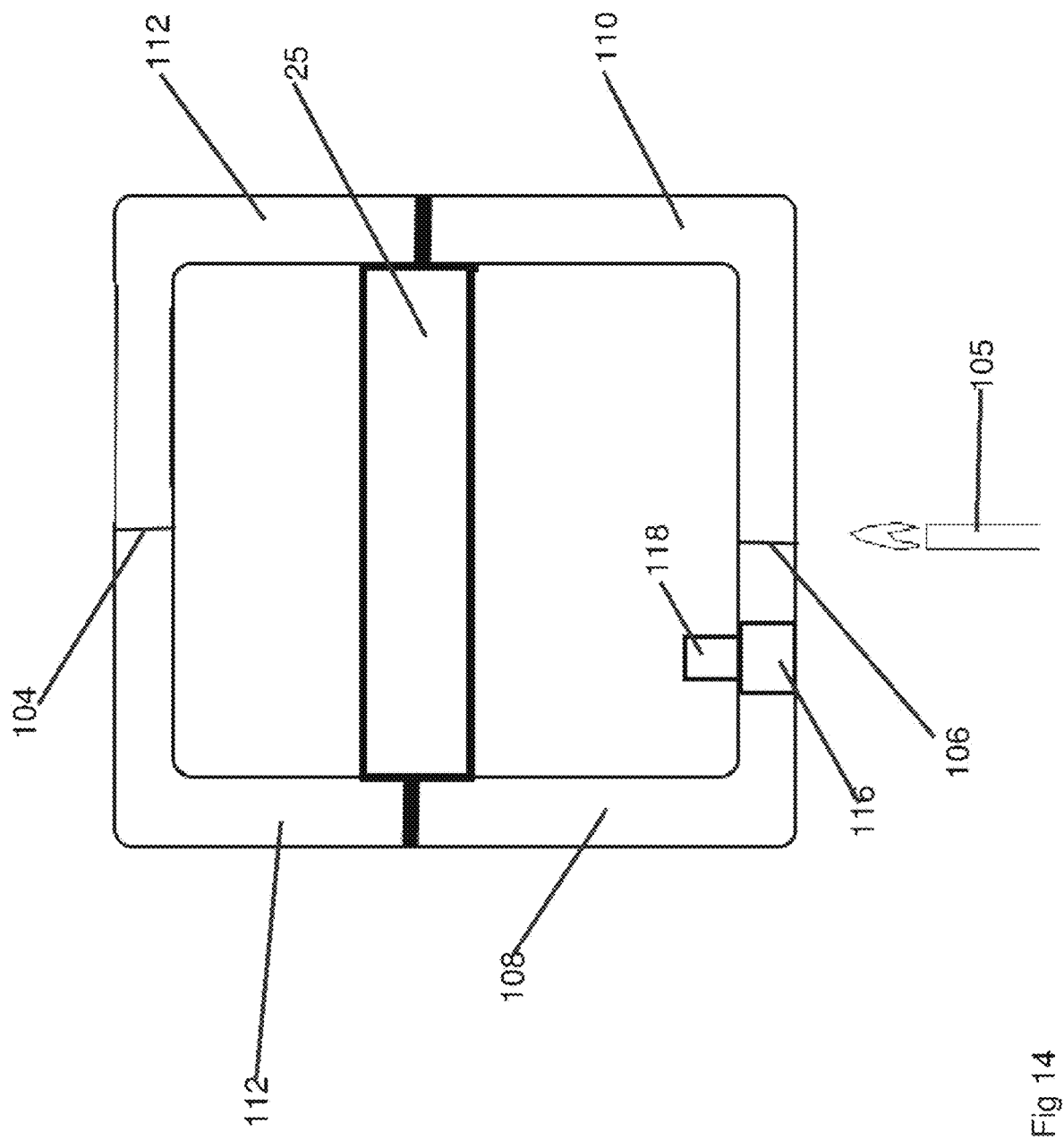
FIG. 14 is a view of the embodiment of a heat engine of FIG. 11 with the heat source, generator, and turbine.

FIG. 14 is another embodiment of this heat engine. In FIG. 14, a turbine 116 is attached to a generator 118. When the liquids 112 and 114 flow around loop 102, the turbine 116 rotates the generator 118 and produces electricity. FIG. 14 also contains a heat exchanger 25. The heavily concentrated liquid 114 would give up heat to the heat exchange as it rises, and the heat would be used to heat the low concentration liquid 112 as it moves towards membrane 106 and the heat.

Figure 15:
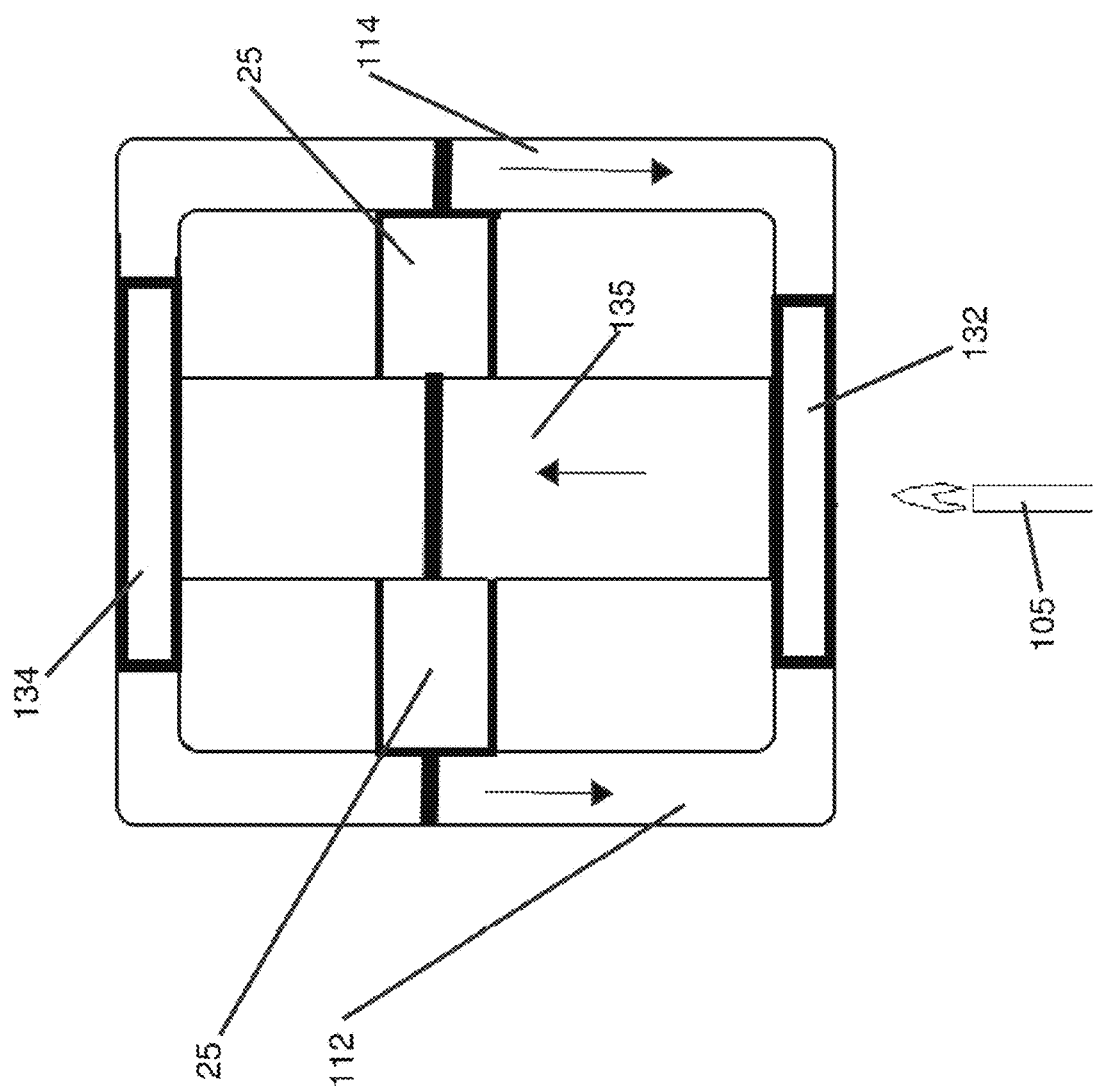
FIG. 15 is a view of the embodiment of a heat engine similar to FIG. 11 with electrodialysis stacks.

FIG. 15 shows another embodiment of the invention. In FIG. 15, the device is similar to the device in FIG. 12. In FIG. 15, the semi-pervious membranes of FIG. 12 have been replaced with electrodialysis stacks 134 and 132. Electrodialysis stacks 134 and 132, consisting of alternating layers of cationic and anionic ion exchange membranes. By flowing a solution of high concentration liquid 114 and a solution of low concentration liquid 112 through the electrodialysis stack 132, electric and medium concentration liquid 135 can be produced. The electrodialysis stack 134 can be run in reverse. The medium concentration liquid 135 can flow through the stack, and with the application of electric, low concentration liquid 112 can be produced. Also, a higher concentration liquid 114 is produced. Medium concentration liquid 135 is piped from electrodialysis stack 132 to electrodialysis stack 134. The electrodialysis stack 134 at the top has medium concentration liquid 135 flowing through it, and it produces low concentration liquid 112 and high concentration liquid 114. The electrodialysis stack 132 at the bottom will produce more electricity when heated then is used to change the medium concentration liquid 135 into low concentration liquid 112 and high concentration liquid 114 in the electrodialysis stack 134 at the top when cooled. Thus, there is a net gain in electricity. FIG. 15 also contains a heat exchanger 125. The medium concentrated liquid 135 gives heat to the heat exchanger 125 as it rises, and the heat would be used to heat the high concentration liquid 114 and the low concentration liquid 112 as they move towards electrodialysis stack 132.

Figure 16:
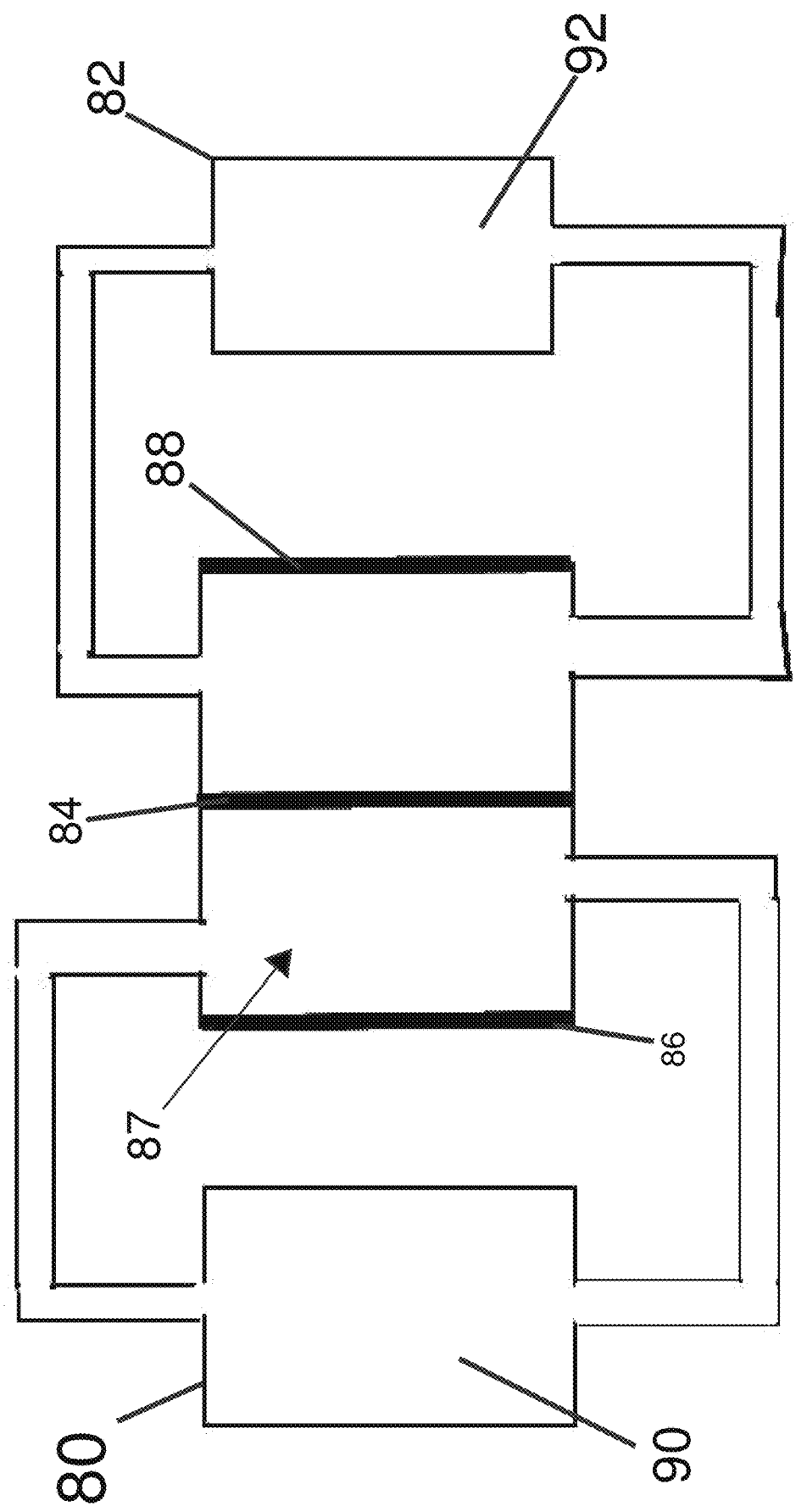
FIG. 16 is a view of a flow battery.

FIG. 16 shows a flow battery. A flow battery is comprised of 2 tanks 80 and 82. Tanks 80 contains liquid 90, and tank 82 contains liquid 92. These liquids 90 and 92 in tanks 80 and 82 are pumped past a membrane 84 held between two electrodes 86 and 88 in a reaction chamber 87. An ion exchange providing a flow of electric current occurs through the membrane 84 while both liquids 90 and 92 are circulating in their respective space, as shown in FIG. 16. The flow battery can be recharged by flowing electricity through the battery.

Figure 16A:
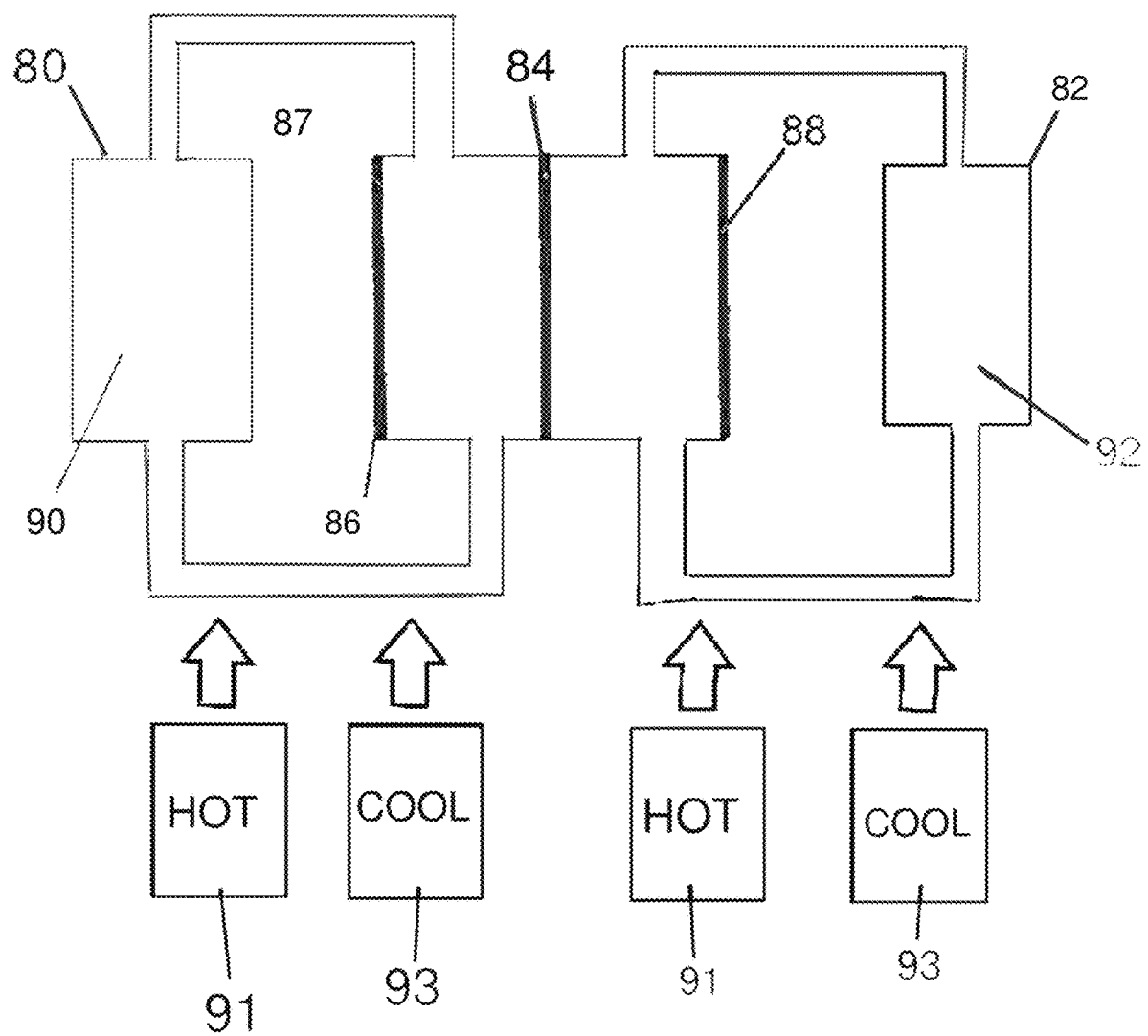
FIG. 16A is a view of a flow battery hook to a heating source and a cooling source.

If the liquids 90 and 92 are heated and then pumped past a membrane 84, the flow battery will give off more electrical energy. In the recharging process, if the liquids 90 and 92 are cool and then ran past the membrane 84, the flow battery will use less energy to charge. This makes flow batteries ideal as an energy storage system for the grid. During the daytime, when the flow battery will be discharging most of its energy, the liquids 90 and 92 could be heated by a solar heater or heat from waste energy of our factories and homes. During the night, when electric is used less and is cheapest, the flow battery could be cooled by the evening air and thus be able to store more energy. FIG. 16A shows the flow battery attached to a heat source 91 which could be a solar panel or a source of industrial or home waste heat. The flow battery in FIG. 16A is also attached to a cooling source 93. This could be ambient air. In the daytime, when the flow battery will be discharging, the liquids 90 and 92 will be allowed to flow through heat source 91. During the nighttime, the liquids 90 and 92 will be cooled by cooling source 93. The flow battery will give off more electrical energy when heated then the energy to charge the battery when cooled. There will be a net gain of energy from the temperature difference.

Any battery system, when heated during discharging, will give off more electrical energy than is necessary to charge the system when cooled. There will be a net gain of energy from the temperature difference. FIG. 16 C shows this type of battery system. FIG. 16 C shows the battery system 95 attached to a heat source 97 and a cool source 99. When the battery 95 is being charged, the cool source 99 cools the battery. This cool source could be the ambient air. When the battery 95 is discharging, the battery 95 is attached to a heat source 97, such as waste heat from industry or the home or solar panels.

Figure 17:
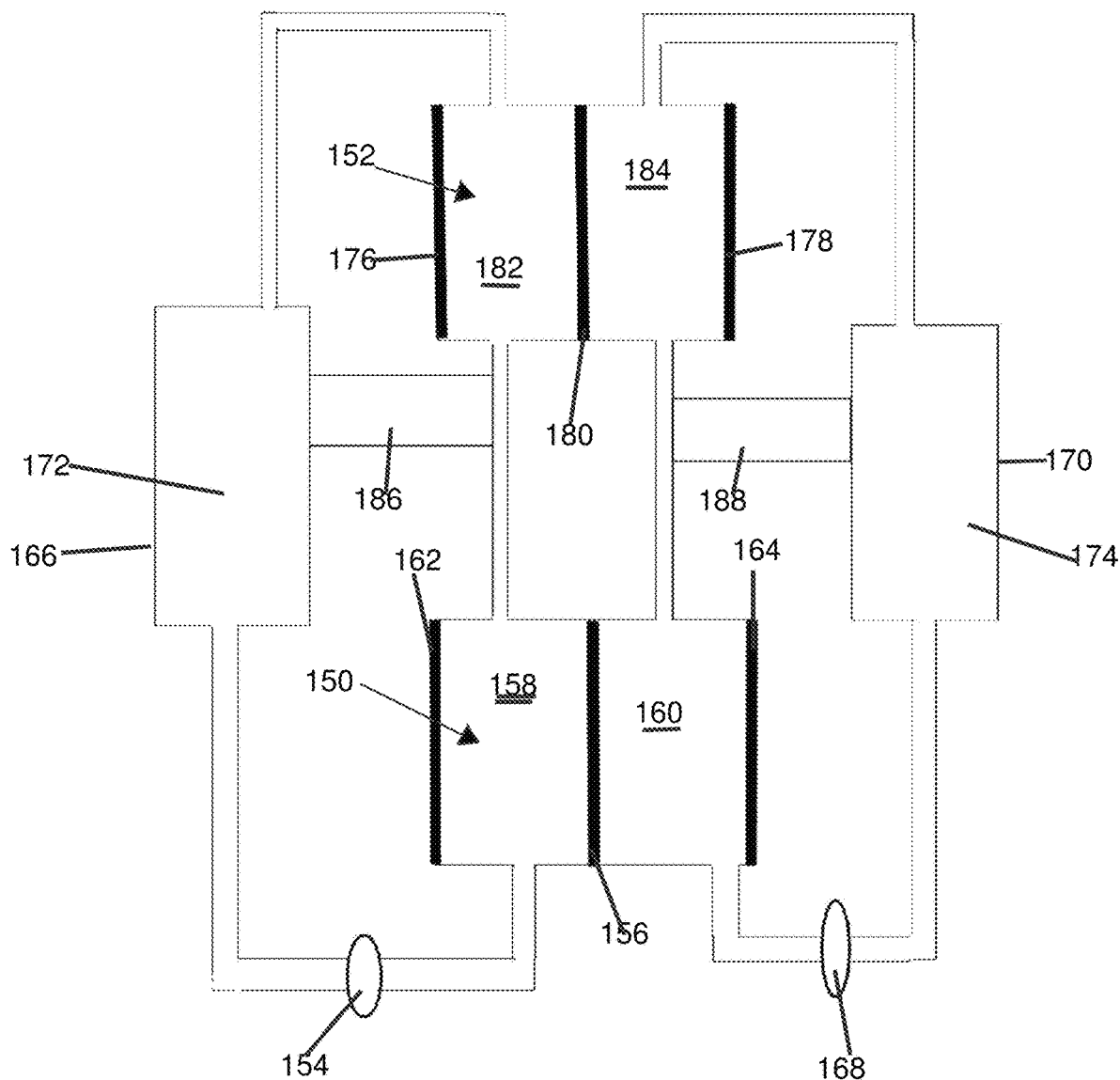
FIG. 17 is a view of a flow battery configuration as a heat engine.

The flow battery can be created to form a heat engine. FIG. 17 shows this configuration. In FIG. 17, there are two reaction chambers 150 and 152. Hot reaction chamber 150 is heated. The reaction chamber 50 can be heated or the liquids 174 and 172 flowing into the reaction chamber 50 can be heated. Cool reaction chamber 152 is cooled, or the liquids 174 and 172 flowing into reaction chamber 152 are cooled. Hot reaction chamber 150 has electrodes 162 and 164 at each end. Through its center is a hot membrane 156. Hot membrane 156 divides hot reaction chamber 150 into two sections 158 and 160. Pump 154 pumps liquid 172 from tank 166 to section 158 of the hot reaction chamber 150. Pump 168 pumps the liquid 174 from tank 170 to section 160 of hot reaction chamber 150. Ions move back and forth between sections 160 and 158 through membrane 156. When electrodes 162 and 164 are attached through a load, electricity will flow through the load.

In FIG. 17, the liquids 172 and 174 move out of reaction chamber 150 and into reaction chamber 152. Reaction chamber 152 is exactly like reaction chamber 150. Reaction chamber 152 has electrodes 176 and 178 and membrane 180. Reaction chamber 152 is divided into two sections 182 and 184. Electrode 176 is in section 182, and electrode 178 is in section 184. Liquid 172 flow from section 158 of reaction chamber 150 into section 182 of reaction chamber 152 and liquid 174 flow from section 166 into section 184 of reaction chamber 152. Electrodes 176 and 178 are charged, and electricity flows through the reaction chamber 152 to charge the liquid 172 and 174. Since reaction chamber 150 is warmer than reaction chamber 152, more electric will be produced by the discharge of liquids 172 and 174 than will be used to charge liquids 172 and 174.

FIG. 17 also shows heat exchangers 186 and 188. Heat exchanger 186 takes the heat from liquid 172 flowing up to reaction chamber 152 and heats the liquid 172 flowing down to reaction chamber 150. Heat exchanger 188 takes the heat from liquid 174 flowing up to reaction chamber 152 and heats the liquid 174 flowing down to reaction chamber 150.

Figure 18:
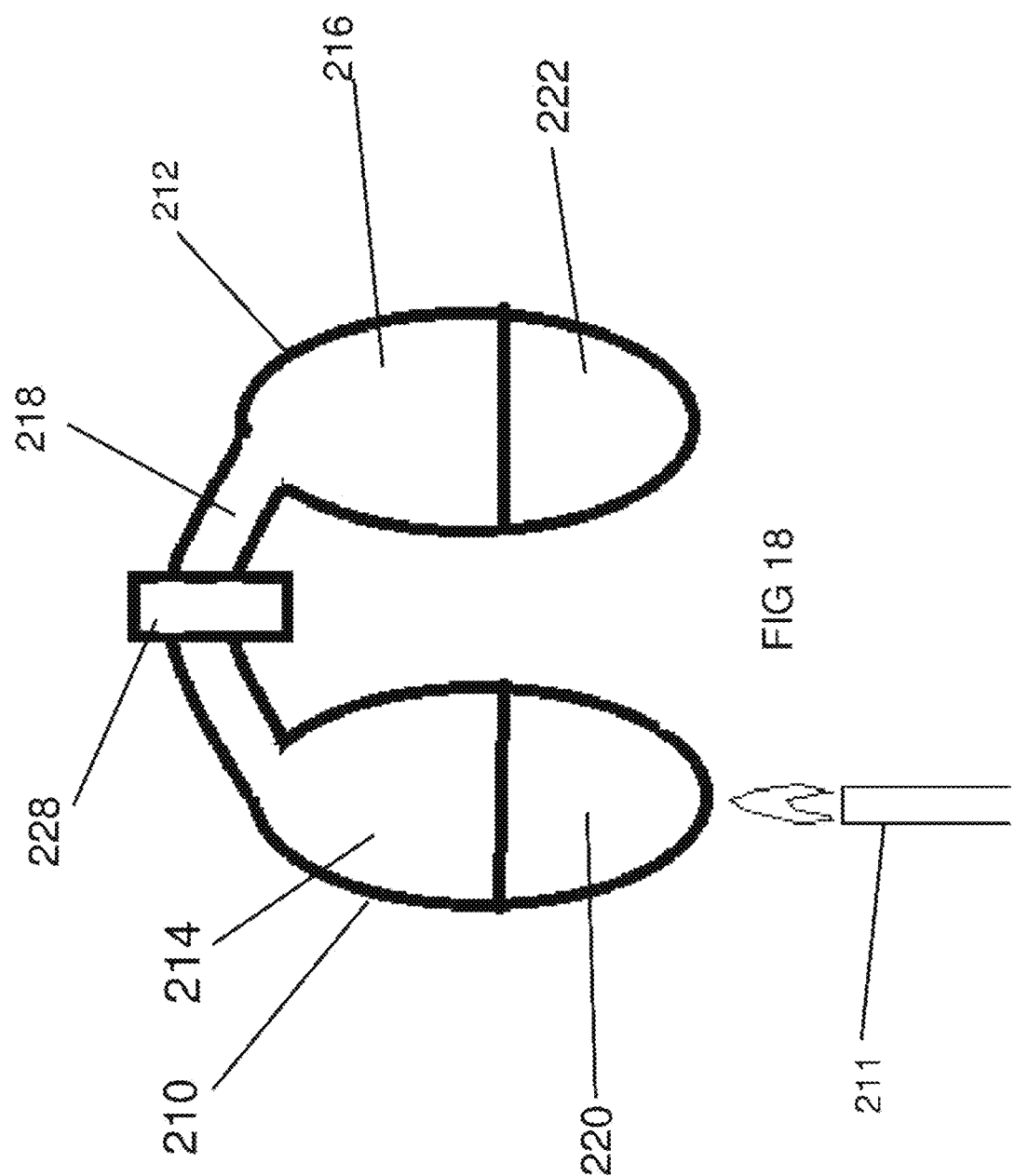
FIG. 18 is a view of a two vessel heat pump and heat storage system.

FIG. 18 shows one embodiment of an invention. The device has two vessels, high concentration vessel 210 and a low concentration vessel 212. The high and low concentration vessels 210 and 212 are connected by tubing as shown in FIG. 18. High concentration vessel 210 contains a high concentration liquid 220 which is a high concentration solution such as salt and water. Low concentration vessel 212 contains a low concentration liquid 222 which is a low concentration solution. The high and low concentration vessels also contain vapor areas 214 and 216. The vapor areas 214 and 216 of the two vessels 210 and 212 are connected by vapor tubing 218. The tubing 218 between the vapor areas 214 and 216 has a valve 228. To store heat energy, the valve 228 is opened between the vapor areas 214 and 216 of the high and low concentration vessels 210 and 212. Heat from heat source 211 is applied to the high concentration vessel 210. The vapor is driven from this high concentration liquid 222 and passes to the low concentration vessel 212 through the tubing 218, making the concentration of the solution even higher in vessel 210. The vapor condenses in the low concentration vessel 212 making the solution in the low concentration vessel 212 more dilute. When the heat is removed the valve 228 is closed. This eliminates the vapor being reabsorbed by the high concentration liquid 220 and ensured that the heat energy will be stored.

To retrieve the stored energy valve 228 connecting the vapor system is opened. The liquid in the lower concentration vessel 212 absorbs heat from the environment, and some of the liquid vaporizes and travels to the high concentration vessel 210. The liquid in the high concentration vessel 210 has a lower vapor pressure than the liquid in the lower concentration vessel 212. This causes the liquid in the lower concentration vessel 212 to evaporate and thus absorb heat from the environment and flows to the higher concentration vessel 210, where it condenses giving off heat to the environment.

In the preferred embodiment, a salt solution is used. However, vessel 220 could contain a solid that absorbs a liquid's vapor, like silicone gel or activated charcoal, which absorbs water vapor or alcohol vapor. The silicone gel with its absorbed water would be heated, and some of the water would be driven off in water vapor and condensed in the other vessel. When the heat was need the value 228 would be open, and the silicone gel would absorb some of the water vapor in the vessel 220 giving off heat. In the other vessel 222, some of the liquid would evaporate, taking heat from the environment. The system could also contain a liquid that absorbs a gas, such as ammonium.

Figure 20:
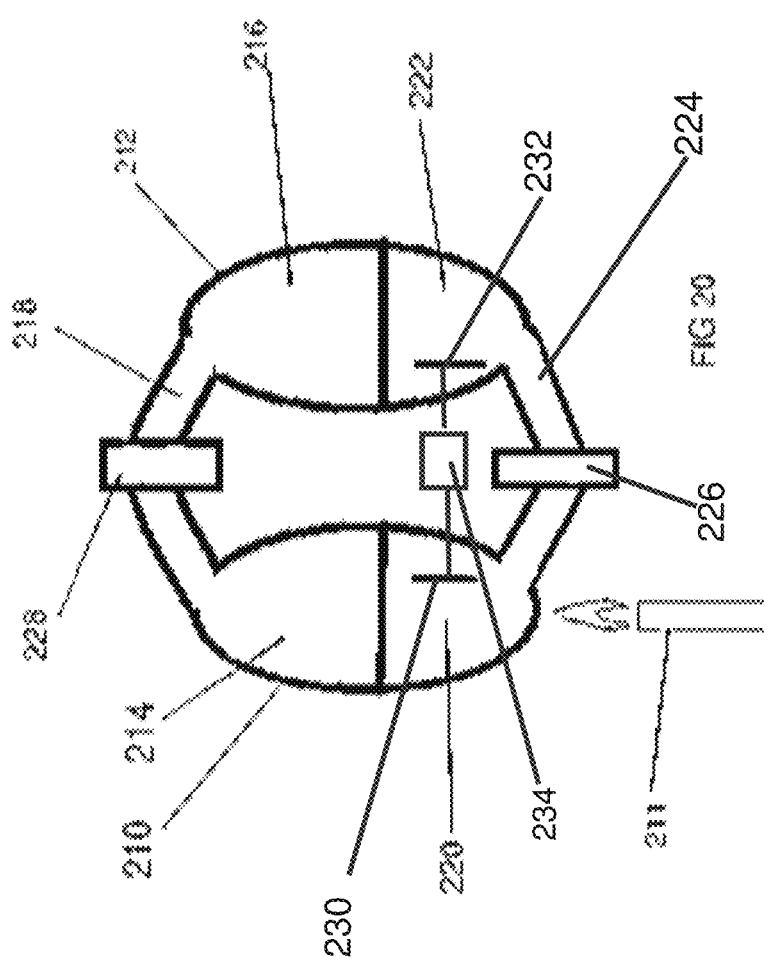
FIG. 20 is a view of a two vessel heat pump and heat storage system of FIG. 18 with electrodes to produce electricity.

Another embodiment of this invention shown in FIG. 20 is exactly like the previous embodiment except electrodes 230 and 232 are placed in each of the vessels 210 and 212 and, the liquid tubing 224 between the high and low concentration liquids 220 and 222 has a valve 226. The device now can work as a heat engine with no moving parts other than vapor that directly changes heat into electric. In this embodiment, the valves 226 and 228 in both the liquid tubing 224 and the vapor tubing 218 are open. In this setup, low concentration liquid 222 will pass from the lower concentration vessel 212 into the higher concentration vessel 210. If the electrode 230 and 232 in each vessel are attached to a load 234 electric will flow through the load 234 when the low concentration liquid 222 from the lower concentration vessel 212 is moving to the high concentration vessel 212. To keep the liquids 220 and 222 at the same level in each vessel 210 and 212 heat is added to the high concentration vessel 210 causing some of the liquid 220 in the high concentration vessel 210 to vaporize. This vapor passes to the low concentration vessel 212 through the tube 218. The vapor condenses in the low concentration vessel 212. Thus, the low concentration liquid 222 and the high concentration liquid 220 in both vessels 210 and 122 remain nearly the same. As long as the low concentration liquid 220 from the lower concentration vessel 212 flows to the high concentration vessel 210 electric from the electrodes will pass through the load 234. This is a heat engine that turns heat into electrical energy.

Figure 19:
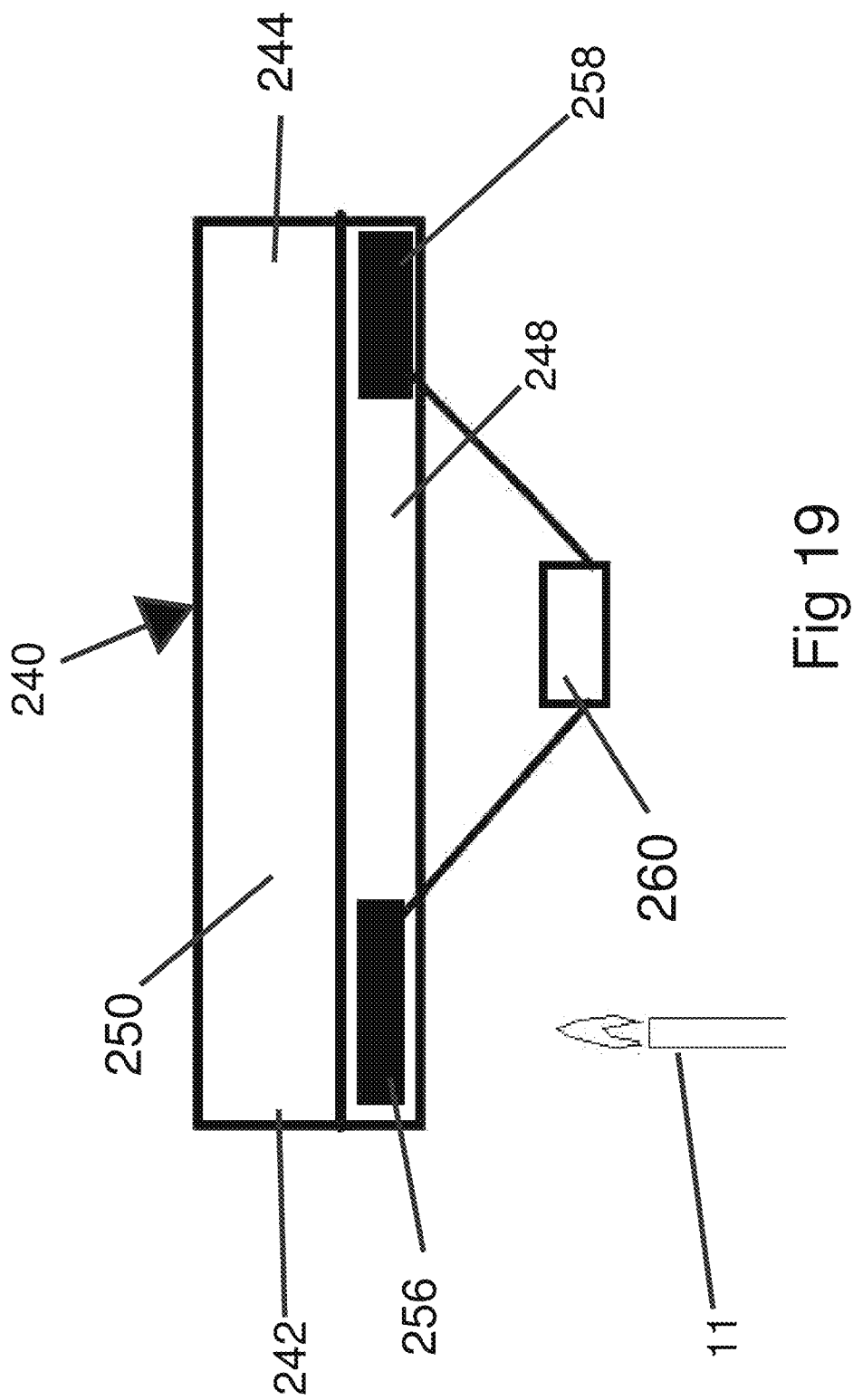
FIG. 19 is a view of a heat pipe heat engine.

Another embodiment shown in FIG. 19 of this invention is a heat pipe 240. The heat pipe 240 comprises two ends 242 and 244 and containing a wick 248 and a channel 250 for the vapor to pass. A high concentration liquid saturates the wick 248 at one end 242. A low concentration liquid saturates the wick 248 at the other end 244. The low concentration liquid will flow through the wick 248 into the high concentration liquid. Within the wick 248 are two sets of electrodes 256 and 258. One set 256 is set where the liquid is of high concentration, and the other set 258 is set where the liquid is of low concentration 244. The electrodes 256 and 258 are attached to a load 260. When heat source 11 is applied to the end 242 with the high concentration liquid 254, some of the liquid will evaporate, and the vapor pass through the tubing to the end 244 with the liquid of low concentration 256. Vapor 252 condenses in end 244. The low concentration liquid 256, as stated above, passes through the wick 248 to the end 242 containing the high concentration liquid 254. When the liquid 256 of low concentration passes through the wick 248 from end 244 to end 242, electric will flow through the load 260. This is another form of a heat engine that turns heat into electrical energy. This system is ideally suited for the use of ammonium water solution.

Figure 21:
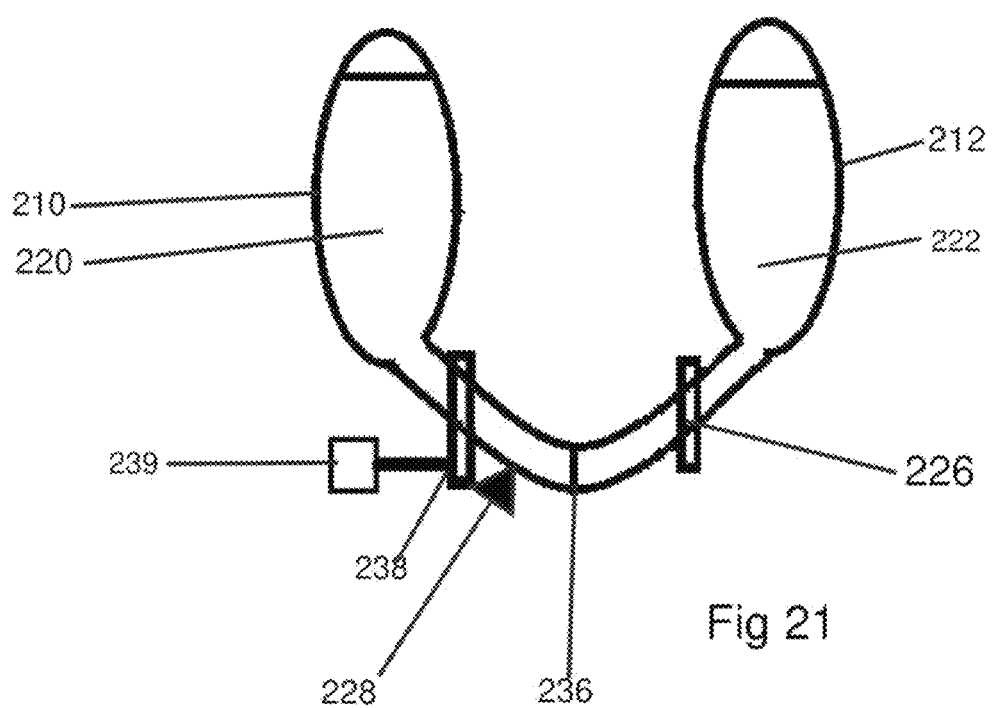
FIG. 21 is a view of a two vessel heat pump and heat storage system that can store mechanical and electrical energy.

In another embodiment shown in FIG. 21, the device can store mechanical energy. This embodiment is similar to the above embodiments. In this embodiment, there is a low concentration vessel 212 with a low concentration liquid 222 and a high concentration vessel 210 with a high concentration liquid 220. The vessels 210 and 212 each have a liquid area and a vapor area. The high and low concentration vessels 210 and 212 are interconnected by tubing as shown in FIG. 21. High concentration vessel 210 contains a high concentration liquid 220 which is a high concentration solution. Low concentration vessel 212 contains a low concentration liquid 222 that is a low concentration solution. The high and low concentration liquid 220 and 222 of the high and low concentration vessels 210 and 212 are connected by liquid tubing 228. The liquid tubing 228 between the high and low concentration liquids 220 and 222 has a semi pervious membrane 236 and a liquid valve 226. The liquid tubing 224 also contains a pump-turbine 238 for pumping the high concentration liquid 220 through the semi pervious membrane 236 and into the low concentration vessel 212. When the high concentration liquid 220 is pumped through the semi pervious membrane 236, it is changed into low concentration liquid 222 because the salt or solute cannot pass through the semi pervious membrane 236, but the solution can. The liquid tubing 228 also contains pump-turbine 238. The pump-turbine 238 is attached to a mechanical device or generator 239.

To store mechanical energy or electrical energy, the liquid valve 226 is opened between the low concentration liquid 222 and the high concentration liquid 220. Mechanical or electrical energy is applied to the pump 238, and the pump-turbine 238 pumps the high concentration liquid 220 through the semi pervious membrane 236. When the pump-turbine 238 is shut off liquid valve 226 is closed to ensure no loss of stored energy.

To recover the mechanical energy or electrical energy, valve 226 is opened. The low concentration liquid 222 begins to flow into the high concentration liquid 220. The flow of the low concentration liquid 222 into the high concentration liquid 220 drives the pump-turbine 238. The pump-turbine 238 turns the mechanical device or generator 239.

Figure 22:
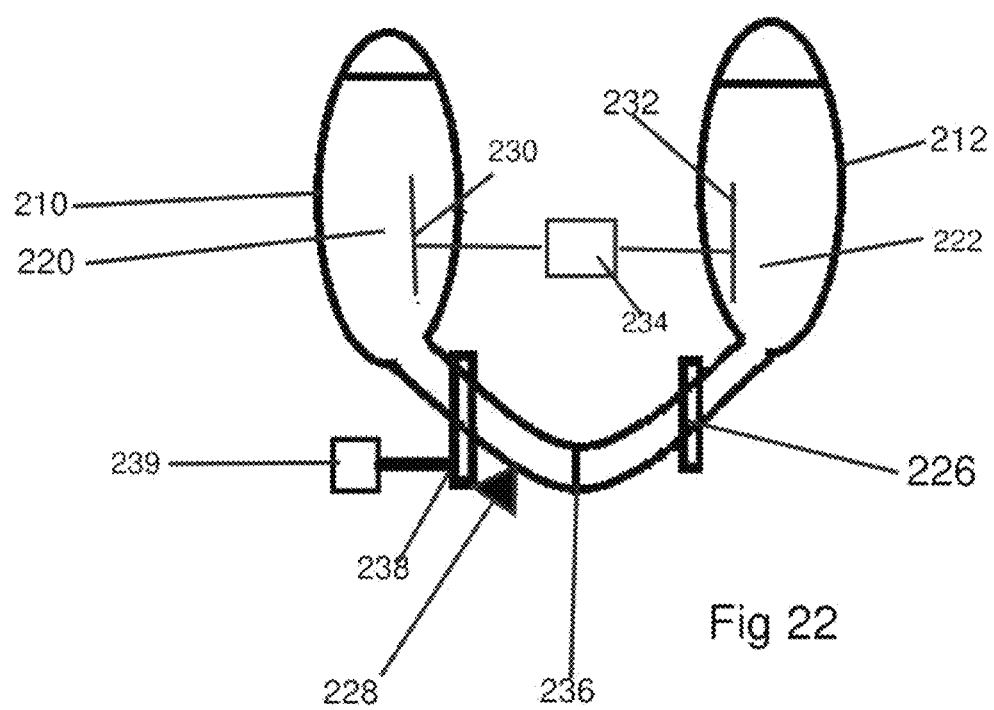
FIG. 22 is a view of a two vessel heat pump and heat storage system that can store mechanical and electrical energy of FIG. 21 with electrodes to produce electricity.

The device can also be used as a battery to store electrical energy. The device, as shown in FIG. 22, is exactly as the one of FIG. 21 except electrode 230 has been placed in the high concentration 220, and electrode 232 has been placed in the low concentration liquid. The electrodes 232 and 230 are attached to load 234. In this embodiment, as in the previous embodiment to store the energy, the liquid valve 226 is opened between the low concentration liquid 222 and the high concentration liquid 220. Electrical energy is applied to the pump-turbine 238 to pump the high concentration liquid 220 through the semi pervious membrane, which only allows the solvent to pass through it. When the electric energy is shut off to the pump-turbine 238, valve 226 is closed to ensure no loss of stored energy.

To recover the energy as electrical energy from the device in FIG. 22, valve 226 is opened. The low concentration liquid 222 begins to flow into the high concentration liquid 220. When the low concentration liquid 222 flows into the high concentration liquid 220 electric will flow through the load 234.

Figure 22A:
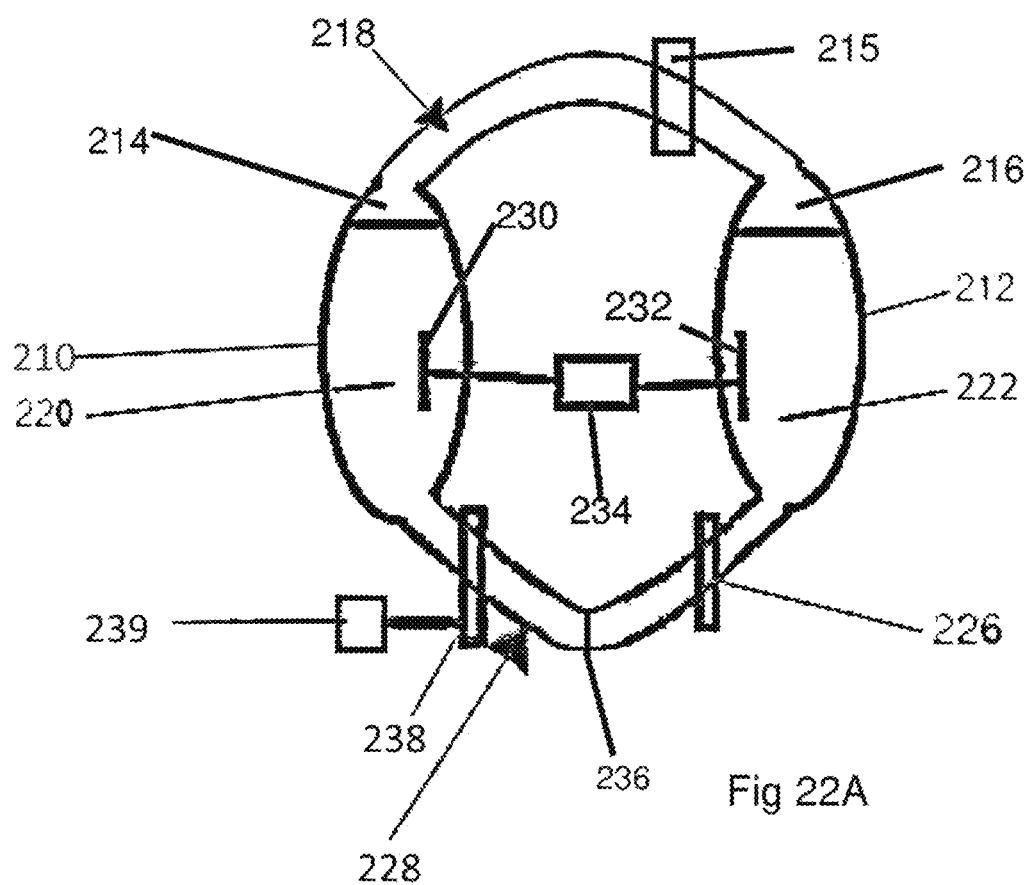
FIG. 22A is a view of a two vessel heat pump and heat storage system that can store mechanical, heat, and electrical energy.

The device shown in FIG. 22A can store heat, mechanical energy, and electric energy with impute of either heat, mechanical, and electric energy. It can also change heat energy into electric or mechanical energy. It can change mechanical into heat or electrical energy or change electrical energy into heat or mechanical. The device in FIG. 22A has two vessels, a high concentration vessel 210 and low concentration vessel 212. The high and low concentration vessels 210 and 212 are interconnected by tubing as shown in FIG. 22A. High concentration vessel 210 contains a high concentration liquid 220 which is a high concentration solution. Low concentration vessel 212 contains a low concentration liquid 222 which is a low concentration solution. Electrodes 230 and 232 are placed in each of the vessels 210 and 212. The electrodes 230 and 232 are attached to a load 234. The high and low concentration liquid 220 and 222 of the high and low concentration vessels 210 and 212 are connected by liquid tubing 228. The vapor areas 214 and 216 of the two vessels 210 and 212 are connected by vapor tubing 218. The tubing 218 between the vapor areas 214 and 216 has a valve 215. The liquid tubing 228 between the high concentration liquid 220 and the low concentration liquid 222 has a liquid valve 226. In FIG. 22A the liquid tubing 228 has a semi pervious membrane 236. The liquid tubing 224 also contains a pump-turbine 238 for pumping the high concentration liquid 220 through the semi pervious membrane 236 and into the low concentration vessel 212. When the high concentration liquid 220 is pumped through the semi pervious membrane 236, it is changed into low concentration liquid 222 because the salt or solute cannot pass through the semi pervious membrane 236, but the solution can. When the value 226 is closed, the electric or mechanical energy that was used to run the pump-turbine 238 is stored.

To recover the mechanical energy or electrical energy, valve 226 is opened. The low concentration liquid 222 begins to flow into the high concentration liquid 220. The flow of the low concentration liquid 222 into the high concentration liquid 220 drives the pump-turbine 238. The pump-turbine 238 turns the mechanical device or generator 239.

Figure 23:
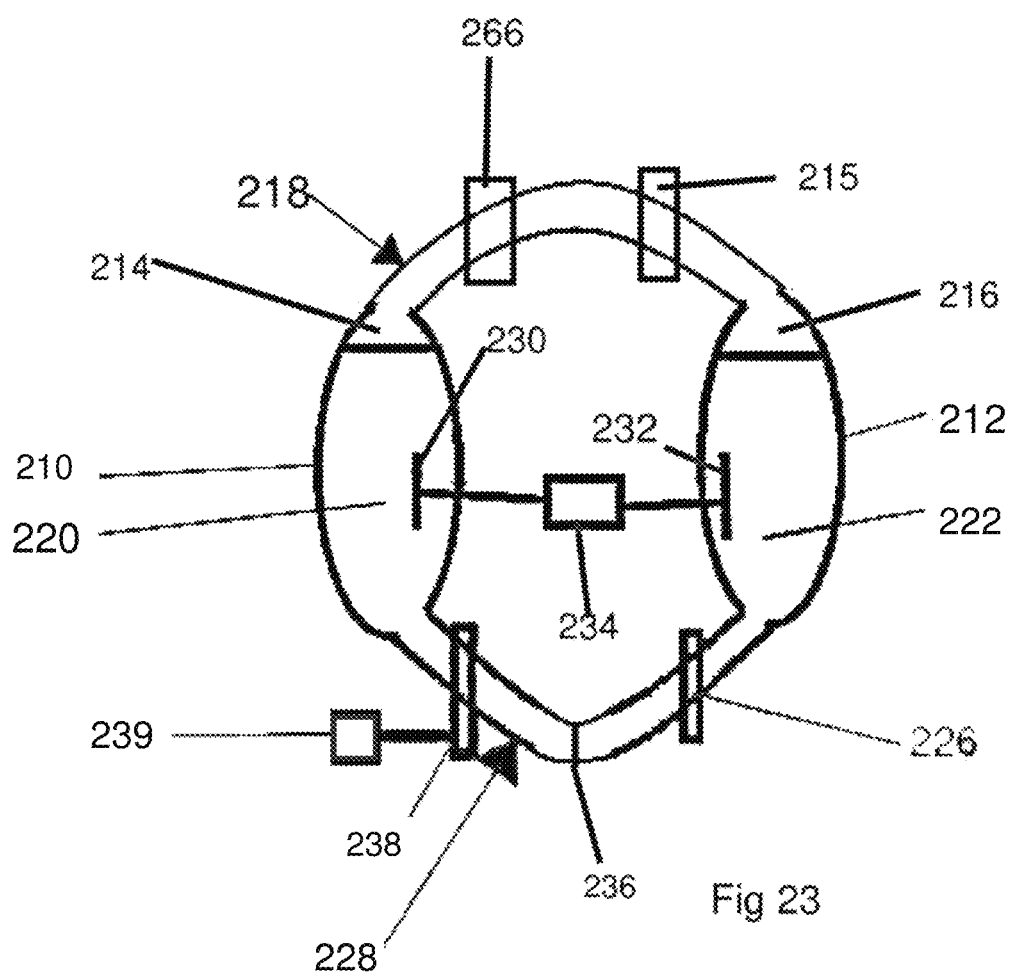
FIG. 23 is a view of a two vessel heat pump and a heat storage system that has an air motor and stores mechanical, heat, and electrical energy.

Another embodiment of this invention is shown in FIG. 23. This embodiment is exactly like the previous except an air motor generator 266 has been placed in the vapor tubing 218. This embodiment allows the invention to store electrical, mechanical, and heat energy.

This embodiment can store heat energy as the previous embodiment. Also, in its storage of heat energy, it can produce mechanical or electrical energy. As in the previous embodiment valve, 215 is open between vapor areas 214 and 216. Heat is applied to the high concentration of the vessel 210. Vapor is driven from the high concentration liquid 222 and passes through air motor generator 266. The vapor drives the air motor generator 266 which produces electrical or mechanical energy.

The embodiment can also change electrical energy into stored heat energy. Electrical energy is transferred to the air motor generator 266, driving the air motor generator 266 that reduces the vapor pressure in the high concentration vapor area 214. This causes more vapor to be produced by the high concentration liquid 220. When this occurs, the high concentration liquid 220 will absorb heat, thus cooling the area around the high concentration vessel 210. The vapor produced by the air motor generator 266 is pumped into the low concentration vessel 212, where it will condensate and give off heat. As in the previous embodiment, we now have stored heat energy, which can be taped just as in the embodiment shown in FIG. 18.

I claim:

1. A system for producing and storing energy comprising:
   a) a tube with two ends; and,
   b) a wick with two ends whose ends correspond with the ends of the tube within the tube; and,
   c) a first passage with two ends whose ends correspond with the ends of the tube and the wick within the tube; and,
   d) a first reservoir containing the high concentration liquid which saturates the wick at one end of the wick; and,
   e) a second reservoir containing low concentration liquid saturates the wick at the other end of the wick; and,
   f) a first electrode placed within the high concentration liquid; and,
   g) a second electrode positioned within the low concentration liquid; and,
   h) heat is applied to the end of the tub that contains the wick that is saturated with the high concentration liquid; and,
   i) when heat is applied some of the liquid of the high concentration liquid vaporizes and travels down the first passage to the portion of the wick saturated with the low concentration liquid where it cools and vaporizes into the low concentration liquid, and the low concentration liquid flows through the wick and into the high concentration liquid and when the electrodes within the high concentration liquid and low concentration liquid are attached to a load electric will flow.

2. A system for producing and storing energy comprising:
   a) a first reservoir has a top and a bottom and is partially filled with a low concentration liquid; and,
   b) a second reservoir has a top and bottom that corresponds to the top and bottom of the first reservoir and is partially filled with a high concentration liquid; and,
   c) a conduit that attaches the top of the first reservoir and to the top of the second reservoir that allows vapor to flow between the two reservoirs; and
   d) a first value in the conduit that can shut off the flow of vapor between the reservoirs; and,
   e) a heat source applies heat to one of the reservoirs creating vapor in the reservoir that passes through the conduit; and,
   f) a first electrode placed within the high concentration liquid; and,
   g) a second electrode placed within the low concentration liquid; and,
   h) the first and second electrodes are attached through a load.

3. A system for producing and storing energy comprising:
   a) a first reservoir that has a top and a bottom and is partially filled with the low concentration liquid; and,
   b) a second reservoir has a top and bottom that corresponds to the top and bottom of the first reservoir and is partially filled with the high concentration liquid; and,
   c) a first channel is attached near the bottom of the first and second reservoir and allows for direct contact between the high concentration liquid and the low concentration liquid and allows the low concentration liquid to flow into the high concentration liquid; and,
   d) a first electrode placed within the high concentration liquid; and,
   e) a second electrode placed within the low concentration liquid; and,
   f) the first and second electrodes are attached through a load: and, g) a first value in the first channel that can stop the flow of low concentration liquid from the first reservoir to the second reservoir; and, h) a second channel that attaches the top of the first reservoir to the top of the second reservoir that allows vapor to flow between the first and second reservoir; and, i) a heat source applies heat to one of the reservoirs creating vapor in the reservoir that passes through the second channel; and j) a second value in the second channel that can shut off the flow of vapor between the reservoirs.

4. A system for producing and storing energy as in claim 3 further comprising:

a) a heat source applies heat to the low concentration liquid; and, b) vapor will pass from the low concentration liquid and into the high concentration liquid through the second channel where it will condense into the high concertation liquid, and electric will flow through the load.

5. A system for producing and storing energy comprising:

a) a first reservoir that holds a liquid containing a solvent and a solute; and, b) a second reservoir; and, c) a membrane that wicks the liquid from the first reservoir to a second reservoir; and, d) the membrane has a first electrode on the side facing the first reservoir and a second electrode on the side facing the second reservoir e) a heat source that heats the second reservoir sufficiently to vaporize the solvent making the liquid in the second reservoir more concentrated than the liquid in the first reservoir; and, f) a means for condensing the solvent; and, g) a means for collecting the solvent; and, h) the first and second electrodes are attached through a load.

6. A system for producing and storing energy comprising:

a) a first reservoir containing a low concentration liquid; and b) a second reservoir containing a high concentration liquid: and, c) a third reservoir: and, d) the high concentration liquid flows from the second reservoir and into the third reservoir; and, e) the high concentration liquid in the third reservoir is heated to a temperature where the solute in the high concentration liquid change into a gas but the temperature is lower than the boiling point of the solvent and the solute is driven off; and f) a motor generator that is driven by the gas-driven off by the heating of the high concentration liquid in the third reservoir; and g) the gas is returned to the second reservoir where the high concentration liquid reabsorbs the gas; and, h) a first electrode placed within the second reservoir; and, i) a second electrode placed within the first reservoir; and, j) the first and second electrodes are attached through a load.

7. A system for producing and storing energy comprising:

a) a pipe through which the high concentration liquid flows that extends into a body of low concentration liquid; and, b) the pipe has a set of openings on the portion of the pipe that extends into the body of low concentration liquid and the openings allow for direct contact between the high concentration liquid and the low concentration liquid and allow the low concentration liquid to flow into the high concentration liquid; and, c) a first electrode within the pipe and within the high concentration liquid; and, d) a second electrode outside the pipe and within the low concentration liquid: and, e) the first and second electrodes are attached through a load.

8. A system for producing and storing energy as in claim 3 further comprising:

a) a heat source applies heat to the high concentration liquid;

b) wherein vapor will pass from the high concentration liquid and into the low concentration liquid through the second channel where it will condense into the low concertation liquid, and electric will flow through the load.

9. A system for producing and storing energy as in claim 3 further comprising:

a) an air motor-generator in the second channel that can move vapor from one reservoir to the other or produce electric energy from the flow of vapor from one reservoir to the other.

* * * * *